(12) United States Patent
Grant et al.

(10) Patent No.: US 11,871,396 B2
(45) Date of Patent: Jan. 9, 2024

(54) METHODS AND APPARATUSES FOR HANDLING BEAM FAILURE

(71) Applicant: Telefonaktiebolaget LM Ericsson (publ), Stockholm (SE)

(72) Inventors: Stephen Grant, Pleasanton, CA (US); Mattias Frenne, Uppsala (SE); Andreas Nilsson, Gothenburg (SE); Claes Tidestav, Bålsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/825,385

(22) Filed: May 26, 2022

(65) Prior Publication Data

US 2022/0369304 A1 Nov. 17, 2022

Related U.S. Application Data

(63) Continuation of application No. 16/860,617, filed on Apr. 28, 2020, now Pat. No. 11,350,415, which is a
(Continued)

(51) Int. Cl.
*H04W 72/044* (2023.01)
*H04B 7/022* (2017.01)
(Continued)

(52) U.S. Cl.
CPC .......... *H04W 72/046* (2013.01); *H04B 7/022* (2013.01); *H04B 7/0617* (2013.01);
(Continued)

(58) Field of Classification Search
None
See application file for complete search history.

(56) References Cited

U.S. PATENT DOCUMENTS 10,700,752 B2  6/2020  Jung
2007/0252603 A1 * 11/2007  Restrepo .............. H02H 1/0015
                                                                324/536
(Continued)

FOREIGN PATENT DOCUMENTS

EP  3 280 068   2/2018
EP  3535855     9/2019
(Continued)

OTHER PUBLICATIONS

InterDigital Communications, "Beam-based aspects for New Radio" 3GPP TSG-RAN WG2 #95-BIS, R2-167137 (Updated to R2-165050), Kaohsiung, Taiwan, Oct. 10-14, 2016, 6 pages. cited by applicant.
(Continued)

*Primary Examiner* — Jay P Patel
(74) *Attorney, Agent, or Firm* — Rothwell, Figg, Ernst & Manbeck, P.C.

(57) ABSTRACT

Some embodiments of this disclosure provide a method performed by one or more transmission points, TRPs, for communicating with a user equipment, UE. In some embodiments, the method includes: using a first transmit, TX, beam to communicate with the UE; receiving, from the UE, information indicating that the UE has determined that the first TX beam has experienced a beam failure; and after the information is received, using a second TX beam to communicate with the UE.

20 Claims, 13 Drawing Sheets

Related U.S. Application Data continuation of application No. 16/399,491, filed on Apr. 30, 2019, now Pat. No. 11,115,984, which is a continuation of application No. PCT/IB2017/056826, filed on Nov. 2, 2017.

(60) Provisional application No. 62/417,607, filed on Nov. 4, 2016.

(51) Int. Cl.
| | | |
|---|---|---|
| *H04B 7/06* | (2006.01) | |
| *H04W 24/08* | (2009.01) | |
| *H04B 7/08* | (2006.01) | |
| *H04B 7/0404* | (2017.01) | |

(52) U.S. Cl.
CPC .......... *H04B 7/0695* (2013.01); *H04B 7/086* (2013.01); *H04B 7/088* (2013.01); *H04W 24/08* (2013.01); *H04B 7/0404* (2013.01)

(56) References Cited

U.S. PATENT DOCUMENTS

| | | | |
|---|---|---|---|
| 2013/0051364 A1 | 2/2013 | Seol et al. | |
| 2014/0036747 A1 | 2/2014 | Nory et al. | |
| 2015/0036612 A1* | 2/2015 | Kim | H04B 17/382 370/329 |
| 2015/0055488 A1* | 2/2015 | Chen | H04L 5/001 370/242 |
| 2016/0065282 A1 | 3/2016 | Zhang et al. | |
| 2016/0183233 A1 | 6/2016 | Park | |
| 2016/0352477 A1* | 12/2016 | Nishio | H04W 24/10 |
| 2017/0207843 A1 | 7/2017 | Jung et al. | |
| 2017/0207845 A1 | 7/2017 | Moon et al. | |
| 2017/0215117 A1 | 7/2017 | Kwon et al. | |
| 2017/0251460 A1 | 8/2017 | Agiwal et al. | |
| 2017/0303265 A1 | 10/2017 | Islam et al. | |
| 2017/0339012 A1* | 11/2017 | He | H04L 41/0803 |
| 2018/0027594 A1 | 1/2018 | Nagaraja et al. | |
| 2018/0042000 A1 | 2/2018 | Zhang | |
| 2018/0048442 A1 | 2/2018 | Sang et al. | |
| 2018/0054832 A1 | 2/2018 | Luo et al. | |
| 2018/0063883 A1 | 3/2018 | Nagaraja et al. | |
| 2018/0076874 A1 | 3/2018 | McLellan et al. | |
| 2018/0077702 A1 | 3/2018 | McLellan et al. | |
| 2018/0083680 A1 | 3/2018 | Guo et al. | |
| 2018/0084585 A1 | 3/2018 | Lee | |
| 2018/0097556 A1 | 4/2018 | Nagaraja et al. | |
| 2018/0138962 A1 | 5/2018 | Islam et al. | |
| 2018/0184473 A1 | 6/2018 | Park et al. | |
| 2018/0234212 A1 | 8/2018 | Park et al. | |
| 2018/0310283 A1* | 10/2018 | Deenoo | H04W 72/046 |
| 2018/0367200 A1 | 12/2018 | Wiberg et al. | |
| 2019/0021076 A1 | 1/2019 | Zhang et al. | |
| 2019/0104549 A1 | 4/2019 | Deng et al. | |
| 2019/0132851 A1 | 5/2019 | Davydov et al. | |
| 2019/0182007 A1 | 6/2019 | Liu et al. | |
| 2019/0222279 A1 | 7/2019 | Xi et al. | |
| 2019/0261287 A1 | 8/2019 | Deenoo et al. | |
| 2019/0319686 A1 | 10/2019 | Chen, IV | |
| 2020/0068549 A1 | 2/2020 | Kang et al. | |
| 2020/0083947 A1 | 3/2020 | Islam | |
| 2020/0280359 A1 | 9/2020 | Jung | |
| 2020/0358568 A1* | 11/2020 | Nishio | H04L 43/16 |
| 2021/0076335 A1 | 3/2021 | Deenoo | |

FOREIGN PATENT DOCUMENTS

| | | | |
|---|---|---|---|
| JP | 2014527367 | 10/2014 | |
| KR | 20140002558 | 5/2014 | |
| WO | WO-2011076062 A1 * | 6/2011 | ........ H04W 56/0015 |
| WO | 2016/086144 | 6/2016 | |
| WO | WO-2016082779 A1 * | 6/2016 | ........... H04W 56/00 |
| WO | 2016/127403 | 8/2016 | |
| WO | 2016/165128 | 10/2016 | |
| WO | WO-2017053756 A1 * | 3/2017 | ............. H04B 17/24 |
| WO | 2018083624 | 5/2018 | |

OTHER PUBLICATIONS

International Search Report and Written Opinion dated Jan. 31, 2018 issued in International Application No. PCT/IB2017/056826. (18 pages).

European Communication Pursuant to Article 94(3) EPC dated Mar. 30, 2020 Issued In European Patent Application No. 17804950.8. (5 pages).

Samsung, "Discussions on beam recovery", 3GPP TSG RAN WG1 #8 6 bis, R1-1609081, Lisbon, Portugal, Oct. 2016 (3 pages).

Ericsson, "Beam management principles", 3GPP TSG-RAN WG1 #86bis, R1-1609754, Lisbon, Portugal, Oct. 2016 (5 pages).

MediaTek inc, "RLM and RLF in HF NR", 3GPP TSG-RAN WG2 Meeting#95bis, R2-166108, Kaohsiung, Taiwan, Oct. 10-14, 2016 (4 pages).

* cited by examiner

METHODS AND APPARATUSES FOR HANDLING BEAM FAILURE

CROSS-REFERENCE TO RELATED APPLICATIONS

This application is a continuation of U.S. application Ser. No. 16/860,617, filed on Apr. 28, 2020, which is a continuation of U.S. application Ser. No. 16/399,491, filed on Apr. 30, 2019 (now U.S. Pat. No. 11,115,984, issued on Sep. 7, 2021), which is a continuation of International Patent Application No. PCT/IB2017/056826, filed on Nov. 2, 2017 (published as WO 2018/083624), which claims priority to U.S. Provisional Patent Application No. 62/417,607, filed on Nov. 4, 2016. The above identified applications and publications are incorporated by this reference.

TECHNICAL FIELD

Disclosed are embodiments for handling beam failure.

BACKGROUND

The next generation mobile wireless communication system, which is referred to as "5G", will support a diverse set of use cases and a diverse set of deployment scenarios. 5G will encompass an evolution of today's 4G networks and the addition of a new, globally standardized radio access technology known as "New Radio" (NR).

The diverse set of deployment scenarios includes deployment at both low frequencies (100s of MHz), similar to LTE today, and very high frequencies (mm waves in the tens of GHz). At high frequencies, propagation characteristics make achieving good coverage challenging. One solution to the coverage issue is to employ high-gain beamforming to achieve satisfactory link budget. With such high-gain beamforming, the beams are typically quite narrow which makes beam tracking challenging—i.e., finding, maintaining, and switching between suitable beams as a UE moves both within and between the coverage areas of multi-beam transmission points (TRPs) (a.k.a., "transmit-receive points").

Beamforming implies transmitting the same signal from multiple antenna elements of an antenna array with an amplitude and/or phase shift applied to the signal for each antenna elements. These amplitude/phase shifts are commonly denoted as the antenna weights and the collection of the antenna weights for each of the antennas is a precoding vector. Different precoding vector give rise to a beamforming of the transmitted signal and the weights can be controlled so that the signals are coherently combining in a certain angle direction as seen from the antenna array in which case it is said that a beam is formed in that direction. If the antennas of the array are placed in two dimensions, i.e. in a plane, then the beam can be steered in both azimuth and elevation directions with respect to the plane perpendicular to the antenna array.

In 3GPP, at least two broad categories for beam handling have been identified for multi-beam systems: (1) connected mode mobility between a beam transmitted by a source (or serving) TRP and a beam transmitted by a target TRP, where the target is a TRP with which the UE has not established or maintained synchronization; and (2) beam management where beam tracking is required due to UE movement, and the beams are typically transmitted by the same (serving) TRP with which the UE continually maintains time and frequency synchronization. Some embodiments of this disclosure apply to the latter procedure, i.e., beam management.

In what follows, reference is made to a beam-pair link (BPL), which is defined as a pair of beams consisting of a suitable transmit (TX) beam used by a TRP and a suitable receive (RX) beam used by a UE for reliable transmission and reception.

Long Term Evolution (LTE) Radio Link Failure (RLF) Handling

In LTE, RLF declaration triggers a Radio Resource Control (RRC) connection re-establishment attempt, and this process works as follows. The UE continually monitors the "health" of an ongoing connection by measuring the signal-to-interference ratio (SINR) based on always-on, cell-specific reference signals (CRS). An RLF is declared by the UE if the UE deems that the radio conditions are poor enough that reliable reception of the Physical Downlink Control Channel (PDCCH) is not possible. The "poor enough" criterion is controlled by at least 4 parameters, thresholds Qout and Qin, an out-of-sync (OOS) count N310, and a timer T310 which are configured by higher layers. If the SINR measured on CRS falls below the threshold Qout on N310 consecutive measurement intervals, timer T310 is started. The threshold Qout is typically selected to correspond to a target block-error-rate (BLER) on the PDCCH of 10%. If the measured SINR does not sufficiently improve (i.e., rise above the second threshold Qin) before T310 expires, then the UE declares and RLF. This triggers the RRC connection re-establishment attempt—a higher layer, i.e., Layer 3 (RRC), defined process specified in the 3GPP Radio Resource Control specification 36.331. It is similar to the sequence of steps which the UE goes through in transitioning from RRC_IDLE to RRC_CONNECTED mode, except the core network signaling is less in the case that the UE context has not been flushed from the source base station (eNB) and/or the Mobility Management Entity (MME).

The basic connection re-establishment steps start with the UE initiating a cell search. Once the best cell (called the "target cell") is determined the UE acquires system information from the broadcast channel of the target cell. The UE then begins a random access procedure (RACH) using RACH resources (time/frequency resources) specified in the system information. Step 1 of the RACH procedure is for the UE to transmit a RACH preamble that is detectable by the target cell. Once the target eNB detects the RACH preamble, it sends a random access response (RAR) in Step 2 acknowledging a successful preamble detection. In Step 3, the UE sends an "RRC Connection Re-establishment Request" message to the target eNB. This triggers a set of procedures which may involve the target eNB to attempt a context fetch (information about the previous RRC connection) from the original serving cell (called the "source cell"). A context fetch is required if the best cell determined by the UE cell search, i.e., the target cell, is different from the source cell. The context fetch occurs over the X2 connection between the eNB hosting the target cell and the eNB hosting the source cell. If the context fetch is successful, the connection is re-established. If not, a brand new RRC connection is setup which will involve further layer 3 (L3) procedures (e.g., RRC procedures) involving additional core network signaling.

Note that while the above radio link monitoring (RLM) procedures have not yet been defined for 5G NR, it is expected that a similar mechanism will be introduced with appropriate modifications for the new standard.

Reference Signals, antenna ports and quasi co-location (QCL)

In LTE, reference signals (RSs) used for channel estimation are equivalently denoted as antenna ports. Hence a UE can estimate the channel from one antenna port by using the associated RS. One could then associate a certain data or control transmission with an antenna port, which is equivalent to say that the UE shall use the RS for that antenna port to estimate the channel used to demodulate the associated control or data channel. One could also say that the data or control channel is transmitted using that antenna port.

In LTE, the concept of quasi-co location has been introduced in order to improve the channel estimation performance when demodulating control or data channels. The concept relies on that the UE could estimate long term channel properties from one reference signal in order to tune its channel estimation algorithm. For instance, the average channel delay spread can be estimated using one antenna port and used when demodulating a data channel transmitted using another antenna port. If this is allowed, it is specified that the first and second antenna port are quasi co-located (QCL) w.r.t average channel delay spread.

Hence, as used in LTE specifications, two antenna ports are "quasi co-located" if the large-scale channel properties of the channel over which a symbol on one antenna port is conveyed can be inferred from the channel over which a symbol on the other antenna port is conveyed. The large-scale channel properties preferably include one or more of delay spread, Doppler spread, Doppler shift, average gain, and average delay.

In addition, or alternatively, the large-scale channel properties can include one or more of received power for each port, received timing (i.e., timing of a first significant channel tap), a number of significant channel taps, and frequency shift. By performing channel estimation algorithm tuning based on the RSs corresponding to the quasi co-located antenna ports, a quality of the channel estimation is substantially improved.

In NR, it has been agreed to introduce QCL for spatial properties of the channel on top of those QCL parameters use for LTE. By complementing the existing QCL framework with new QCL parameters that depends on spatial channel properties, one can allow a UE to perform spatial processing across different signal types without violating the rule that a UE is not allowed to use measurements from one reference signal to assist in the reception or processing of another signal unless explicitly specified.

Examples of such spatial processing is analog receiver beamforming, and channel estimation using spatial processing gain to improve the channel estimate.

Assume communication between two nodes in a network, a TX node and an RX node. A TX node transmits a first set of reference signals (RS) from one or multiple transmit antenna ports. A RX node receives the transmitted reference signals using one or multiple receive antenna ports and determines or estimates, based on the received first set of transmitted RS, one or more parameters capturing a spatial property of the channel. The RX node determines an indication that a second set of transmitted RS from one or multiple transmit antenna ports are quasi co-located (QCL) with the said first RS, where the QCL is given with respect to the one or more parameters capturing a spatial property of the channel. The TX node transmits the second set of transmit RS from one or multiple transmit antenna ports. The RX node utilizes one or more of the determined parameters capturing a spatial property of the channel that is based on the first set of RS, to assist in the reception of the second set of RS.

In other words, the RX node, typically a UE can use the same RX beamforming weights (a.k.a., antenna weights or "RX beam") to receive the second signals and associated RS (such as a control or a data transmission DMRS) as the RX beamforming weights ("RX beam") it used when it received a first signal (for example a measurement signal, e.g. CSI-RS) if the second RS is QCL with the first RS with respect to spatial parameters.

A QCL parameter related to a spatial property is related to the UE RX beamforming or UE RX reception parameters. Hence, if the UE use two different spatial QCL parameters can indicate that the UE use two different RX beamforming weights (or equivalently two different ways of combining the signals from the UE RX antennas).

Spatial parameters could be angle of arrival, angular spread or spatial correlation, spatial correlation matrix on the RX side or on the TX side.

It has been agreed for NR that information pertaining to UE-side beamforming/receiving procedure used for data reception can be indicated through QCL to UE (from the 5G base station (denoted gNB)).

Mechanism(s) to address in NR beam failure and/or blockage are needed.

SUMMARY

In one aspect, there is provided a method performed by one or more transmission points, TRPs, for communicating with a user equipment, UE. In some embodiments, the method includes: using a first transmit, TX, beam to communicate with the UE, receiving, from the UE, information indicating that the UE has determined that the first TX beam has experienced a beam failure, and after the information is received, using a second TX beam to communicate with the UE. In one embodiment, the method further comprises: as a result of receiving the information from the UE, one of the TRPs transmitting a beam activation command informing the UE that a TRP is or will be using the second TX beam to communicate with the UE. In one embodiment, the method further comprises: as a result of receiving the information from the UE, a first TRP using the first TX beam to transmit a first beam activation command informing the UE that the first TRP is or will be using the second TX beam to communicate with the UE and a second TRP using a second TX beam to transmit a second beam activation command informing the UE that the second TRP is or will be using the second TX beam to communicate with the UE.

In another aspect, the method includes: using a first set of one or more antenna ports as an active set of antenna ports for the UE, and, while the first set of antenna ports is being used as the active set of antenna ports, receiving, from the UE, information indicating that the UE has determined that a TX beam associated with the first set of antenna ports has experienced a beam failure. In some embodiments, the first set of antenna ports is one or multiple CSI-RS antenna ports. In some embodiments, the method further comprises providing to the UE certain parameters, wherein the certain parameters are configured such that the UE has a high probability of detecting a beam link failure before detecting a radio link failure (RLF). In some embodiments, wherein the information is a preamble. In some embodiments, receiving the preamble from the UE comprises a TRP receiving a transmission from the UE on a random access channel, wherein the transmission includes the preamble.

In another aspect, there is provided a TRP that includes: a transmitter, a receiver, a memory, and a data processing system comprising one or more processors, wherein the TRP is configured to perform any of the above described methods.

In another aspect, there is provided a method performed by a user equipment, UE, communicating with one or more transmission points, TRPs, wherein the one or more TRPs are configured to transmit information to the UE using a first beam pair link, BPL, wherein the one or more TRPs use the first BPL as an active BPL for the UE. The method includes: the UE determining whether the first BPL has experienced a beam failure, and, as a result of determining that the first BPL has experienced a beam failure, the UE transmitting a message indicating that the UE has determined that the first BPL has experienced a beam failure. In some embodiments, the method of the message is a beam switch request. In some embodiments, the first BPL comprises a first receive, RX, beam and a first transmit, TX, beam, and the method further comprises the UE using the first RX beam of the first BPL to receive a reference signal transmitted by one or more of the TRPs using the first TX beam. In some embodiments, the method further comprises: the UE using a second RX beam of a second BPL to receive a reference signal transmitted by one or more of the TRPs using a second TX beam. In some embodiments, the reference signal is a channel state information reference signal, CSI-RS. In some embodiments, the method further comprises: after transmitting the message, receiving from a TRP a message informing the UE that a TRP is or will be using a second BPL as the active BPL for the UE. In some embodiments, the method further comprises: after the UE transmits the message, the UE using a second RX beam to search for a scheduling command transmitted to the UE. In some embodiments, the message is a preamble. In some embodiments, the preamble is distinguishable from the preambles that the UE is configured to transmit when the UE is doing a RACH attempt. In some embodiments, transmitting the preamble comprises transmitting the preamble using a random access channel.

In another aspect, there is provided a method performed by a user equipment, UE, communicating with one or more transmission points, TRPs, wherein the UE is measuring two sets of antenna ports, a first set and a second set, transmitted from TRPs, wherein the TRPs use the first set of antenna ports as an active set of antenna ports for the UE. In some embodiments, the method includes: the UE determining whether the first set of antenna ports has experienced a beam failure, and, as a result of determining that the first set of antenna ports has experienced a beam failure, the UE transmitting a message indicating that the UE has determined that the first set of antenna ports has experienced a beam failure. In some embodiments, the message is a beam switch request. In some embodiments, the first set of antenna ports comprises one or more CSI-RS antenna ports. In some embodiments, the method further comprises receiving beam failure parameters, wherein the parameters are configured such that the UE (101) has a high probability of detecting a beam failure before detecting a radio link failure, RLF. In some embodiments, the message is a preamble.

In another aspect, there is provided a UE that includes: a transmitter, a receiver, a memory, and a data processing system comprising one or more processors, wherein the UE is configured to perform any of the above described methods.

BRIEF DESCRIPTION OF THE DRAWINGS

The accompanying drawings, which are incorporated herein and form part of the specification, illustrate various embodiments.

DETAILED DESCRIPTION

According to some embodiments, one approach for robust beam management in a multi-beam system is the maintenance of both an active BPL used for ongoing transmission and reception of data and control signals, and a monitored BPL used for fallback (backup) purposes. Typically, both the active and monitored BPLs are updated as the UE moves and new/better BPLs are discovered. The maintenance of the BPLs can be achieved through UE measurement and feedback to the TRP of the received quality (strength) of reference signals (RS) transmitted semi-persistently/periodically from the TRP on different beams. Furthermore, the reference signal transmissions on a given TRP beam may be repeated to allow the UE a chance to adjust/optimize its receive (RX) beam.

The maintenance of a monitored BPL may be important for robust communication in the case that the active BPL becomes blocked, either by an object that moves into the active BPL path or an object behind which the UE moves and becomes shadowed. Blocking is common at high frequencies where penetration loss through objects is high and diffraction around object edges is poor. When such blocking occurs (or other degradation of the quality of the link occurs) the event is referred to as a "beam pair link failure" or BPLF or simply "beam failure". BPLF can occur either slowly/gradually or very suddenly depending on the UE speed and the motion of objects in the environment. The narrower the beams, the more chance there is for sudden BPLFs to occur. To recover from a BPLF on the active BPL, it may be desirable for the TRP and UE to switch together to the monitored BPL. This process is illustrated in FIGS. 1A, 1B and 1C.

Figure 1A:
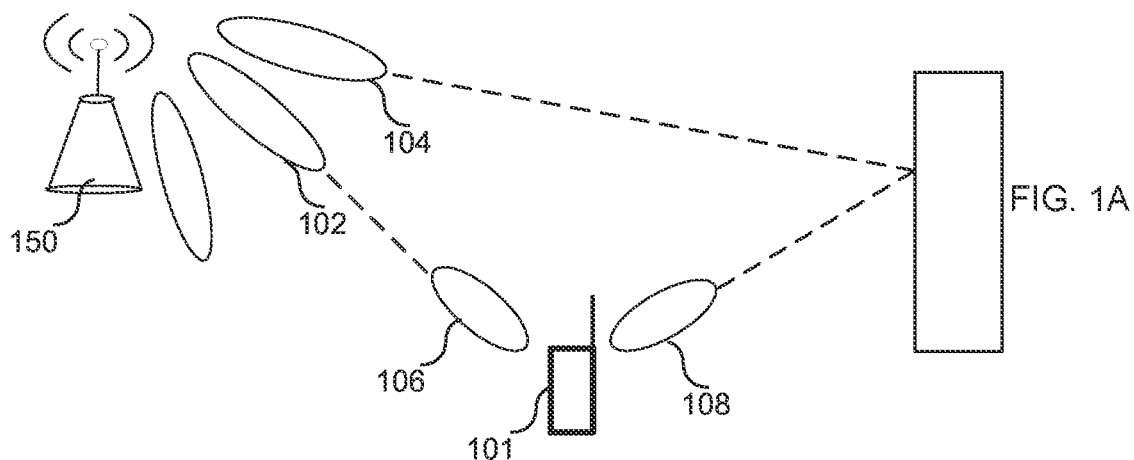
FIGS. 1A, 1B and 1C illustrate the use of active and monitored BPLs for communications between a TRP and a UE.

In FIG. 1A, there is shown a TRP 150 (e.g., a base station) using one active BPL for UE 101 to transmit to the UE control signaling and user data and further using one monitored (backup) BPL for the UE. While FIGS. 1A, 1B, and 1C illustrate a single TRP communicating with the UE, in other embodiments two or more TRPs may be communicating with the TRP (see e.g., FIG. 13), wherein one of the TRPs (e.g., TRP 150) uses the active BPL (e.g., uses a TX beam 102—i.e., certain antenna weights) to communicate with the UE and another of the TRPs (e.g., TRP 950) uses the monitored BPL (e.g., uses a TX beam 104) to communicate with the UE. The active BPL comprises active TX beam 102 and the corresponding active RX beam 106, and the monitored BPL comprises the monitored TX beam 104 and the corresponding monitored RX beam 108.

Figure 1B:
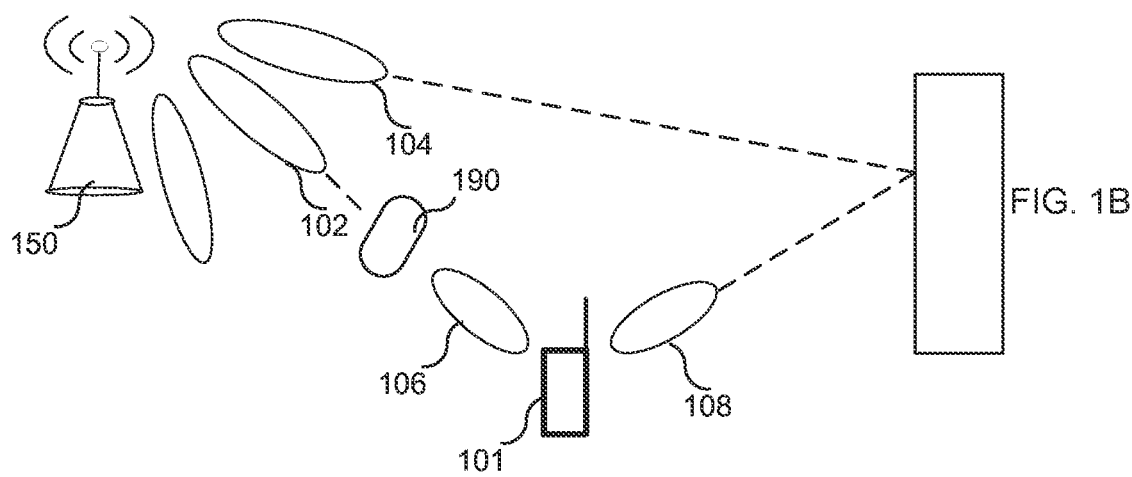

In FIG. 1B there is shown an object 190 that is blocking the active BPL, thereby causing the UE to detect a BPLF with respect to the active BPL (i.e., the active TX beam/active RX beam pair). A problem arises in that the TRP cannot switch to the monitored BPL since the UE is still monitoring the UE RX beam 106 corresponding to the active TX beam 102 as the UE is unaware of the blocking. Moreover, the TRP may also be unaware of the blocking situation.

Figure 1C:
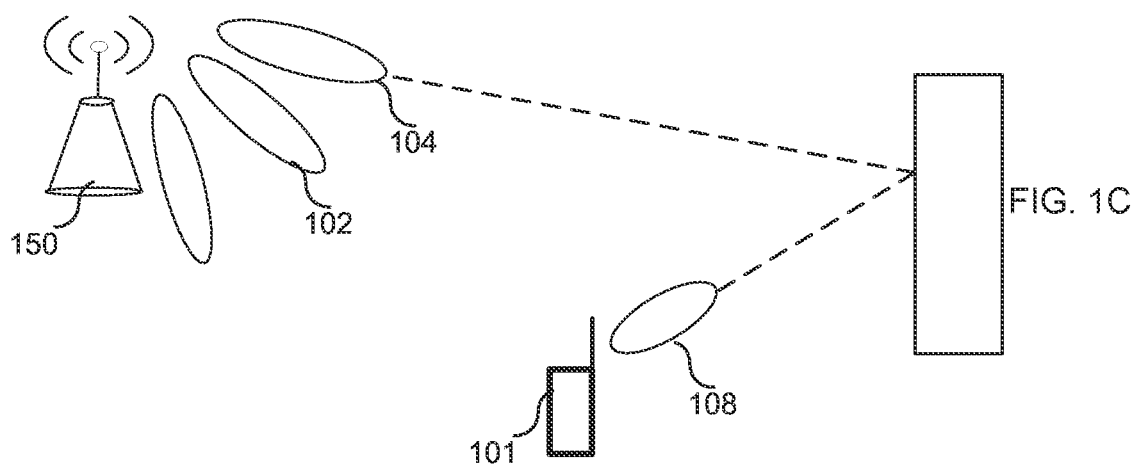

To restore the connection between the TRP and the UE, the TRP can use the monitored BPL as the active BPL for the UE, as illustrated in FIG. 1C. However, to efficiently perform this beam switching, the TRP must first signal to the UE that it will start using the monitored BPL as the active BPL, otherwise the UE will not know which UE RX beam to use during reception (i.e., RX beam 106 or RX beam 108). This is problematic because the active BPL, which is used for control signaling, is blocked and has poor or non-existing channel quality. If the blocking happens slowly, there may be time to perform this signaling before the signal degrades too much. There is a risk that the blocking will happen too quickly such that the TRP does not have time to signal a "beam switch" (a.k.a., "BPL switch") to the UE, and in this case the UE will continue to use the RX beam 106 corresponding to the TX beam 102 that is now blocked.

Some embodiments of this disclosure provide a robust mechanism for BPLF recovery through fallback to the monitored BPL, particularly in the case where sudden beam blockages occur. In this scenario, as described above, there may be no time for the TRP to send control messages over the active BPL to tell the UE to switch to the monitored BPL. Likewise, there may be no time for the UE to provide BPL quality reports over the active BPL to inform the TRP of a BPLF. The term BPLF is chosen since at a high level, BPLF has some similarities (but several key differences) to radio-link failure (RLF) in LTE today.

Two aspects to point out from the above discussion on radio link monitoring (RLM) are that (1) RRC Connection Re-establishment is a L3 (RRC) procedure involving signaling between several nodes in the system (source eNB, target eNB, and potentially MME), and (2) the procedure as defined today is a cell specific, rather than beam-oriented, procedure.

What is needed for in the context of beam-oriented systems for 5G NR is a robust and fast approach for switching between the active and monitored BPLs in the case of a BPLF due to, e.g., a sudden blockage of the active BPL. This ensures that connection gaps as much as possible are not observable by the end user. A key aspect for quick reaction to BPLF is to ensure that the switching process involves only L1 and/or L2 signaling with a single TRP or at most between tightly synchronized TRPs. While radio link monitoring with connection re-establishment triggered by RLF is suitable for catastrophic link failures, it is not suitable for fast switching between an active BPL and a monitored BP due to its relatively slow response times. Furthermore, radio link monitoring as defined today is not a beam-oriented process.

Some embodiments of this disclosure provide a low layer (L1/L2) mechanism for recovery from a beam pair link failure (BPLF) by enabling the network (NW) to switch from an active BPL to a monitored (backup) BPL when the active BPL experiences a BPLF (e.g., quality of active BPL is below a threshold). The mechanism is intended to run in parallel with radio link monitoring which handles catastrophic link failures, but it operates with faster response time allowing fast switching between the active and monitored BPLs.

In one aspect, the mechanism is based on continuous UE monitoring of the quality of the active and monitored BPLs, and in the case that the UE recognizes a BPLF due to serious degradation of the active BPL, it notifies the NW (i.e., transmits a signal). The notification is in form of a preamble, such as a specific RACH preamble, which is called a beam pair link switch (BPS) preamble and which is distinct from those RACH preambles used in the RRC Connection Re-establishment procedure. An important aspect of the BPS preamble is that the NW (e.g., TRP) understands that the BPS preamble is a UE requested (but still network controlled) active/monitored beam switch request. Hence, the NW will not proceed with an RRC Connection Re-establishment procedure as a result of receiving the BPS preamble. As such, the network will not send a random access response (RAR) in response to receiving the BPS preamble, nor will the NW expect a request for connection re-establishment from the UE based on the BPS preamble.

An advantage of this is that the mechanism provides a very fast way of informing the NW that a beam pair link failure (BPLF) has occurred, facilitating a fast switch from the active BPL to the monitored BPL before a radio-link failure (RLF) is declared.

Some embodiments of this disclosure provide an approach for BPL monitoring (BPLM). In an example embodiment, the BPLM includes the following aspects: 1) continuous monitoring of the quality (e.g., signal strength or signal-to-noise-and-interference ratio) of the active and monitored BPL; 2) detection of BPLF based on the quality of at least the active link; and 3) notification of BPLF to the network through the transmission of a preamble transmission (e.g., a specific RACH preamble) called a beam link pair switch (BPS) preamble, which is distinct from those preambles used for either initial system access or RRC re-establishment request attempts. The BPS preamble transmission is to be interpreted by the network as an active/monitored BPL switch request.

Figure 2:
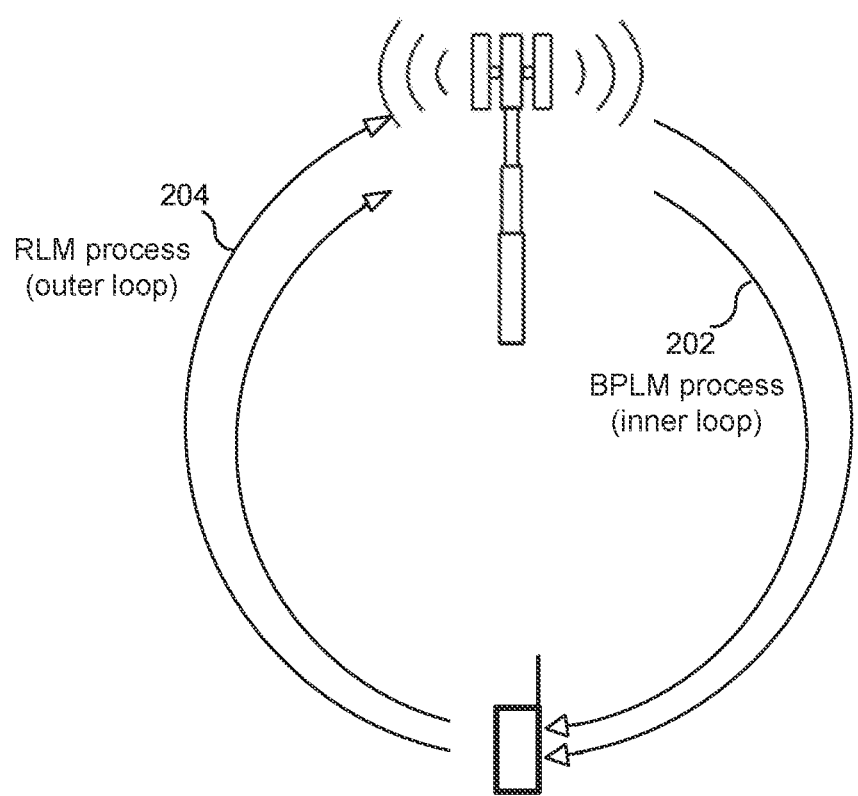
FIG. 2 illustrates a beam link monitoring (BPLM) process.

FIG. 2 shows that the BPLM process (inner loop) 202 can run in parallel (i.e., at the same time) as the radio link monitoring (RLM) process (outer loop) 204. The key difference is that BPLM is strictly a L1/L2 process that whereas RLM involves L3 (RRC). As a result, BPLM is designed to have a faster reaction speed in terms of BPLF detection/BPL switch than RLF detection/RRC connection re-establishment. As such, BPL switch is meant to happen before the UE declares an RLF.

To enable BPLM, the UE is configured to measure the BPL quality, e.g., signal strength or signal-to-noise-and-interference ratio, based on either a UE specific or cell-specific reference signal (RS) that is transmitted on a per BPL basis. An example is the so-called channel state information reference signal (CSI-RS) used in LTE today. A variant of this signal is expected to be standardized for 5G NR. Both the active and monitored BPLs are updated as the UE moves within the coverage area of one or more TRPs, based on, e.g., CSI-RSRP/RSRQ measurements continually fed back from the UE to the NW using the active BPL.

Based on these measurements and feedback reports, typically both the UE and the NW have a view of when or if the active BPL starts to degrade. This degradation can happen relatively slowly, or very suddenly. In the former case, the NW typically has time to take action to switch the active and monitored BPLs and communicate the switch to the UE. However, in the latter (more problematic) scenario, the UE may not have a chance to feedback BPL quality reports to the network before the active BPL is broken. In this case the network loses its ability to recognize if a failure has occurred, since the active BPL carrying the feedback reports becomes unusable.

Therefore, alternative mechanisms to inform the network of a beam pair link failure (BPLF) are introduced.

Embodiment #1

In one embodiment, the BPLF indication mechanism makes use of a special preamble, called a BPL Switch (BPS) preamble. The UE is pre-configured with one or more BPS preambles by the NW such that the NW understands that when it receives a BPS preamble, the BPS preamble should be interpreted as a beam pair link switch request rather than a RACH attempt or an RRC connection re-establishment request. Based on successful BPS preamble detection, the NW switches the active and monitored BPLs and begins transmission of data and/or control on the monitored BPL. The UE then searches for scheduling commands on the PDCCH using the new active BPL (formerly the monitored BPL). Optionally, the NW may send an explicit "BPL activation" command informing the UE of the BPL switch, thus acting as a form of acknowledgement of the switch request.

The UE declaration of BPLF is based on, e.g., the event that the CSI-RSRP/RSRQ on the active BPL falls below a threshold Bout on Nout measurement occurrences. The threshold can be either an absolute threshold, or a threshold relative to the monitored BPL. The parameters Bout and Nout are pre-configured either through high layers (RRC) or by lower layers (L1/L2) on a more dynamic basis. Preferably, the Bout and Nout parameters are chosen to ensure a high probability that the BPLF declaration occurs before the UE declares and RLF based on the Qout, Qin, N310, and T310 parameters.

Embodiment #2

In another embodiment, the UE declaration of beam pair link failure (BPLF) is based on the event that it has not successfully received a PDCCH for a pre-determined time Tout. The parameter Tout is pre-configured either through high layers (RRC) or by lower layers (L1/L2) on a more dynamic basis. Preferably, Tout is chosen to ensure a high probability that the BPLF declaration occurs before the UE declares and RLF based on the Qout, Qin, N310, and T310 parameters.

Embodiment #3

In yet another embodiment, multiple BPS preambles are used and each BPS preamble is transmitted in a different UE TX beam, i.e. the different transmissions are not mutually QCL with respect to spatial properties. In this way there can be a higher probability that the transmission reaches a network node.

Embodiment #4

In yet another embodiment, the UE transmits the BPS preambles multiple times in a specified order across different UE TX beams and at specified time instants and frequency locations, wherein the order a certain UE TX beam (or its spatial QCL parameter properties) are known by the network so that the network (or TRP (e.g., gNB)) can use the corresponding RX beams to receive the BPS preamble. For instance, the UE may transmit the first preamble in the UE TX beam corresponding to the active link, and the second and third preamble in the UE TX beams corresponding to a first and second monitored links respectively and so on. In this way the TRP can always direct its receive beam for each individual and expected BPS preamble transmission from the UE since it knows which UE TX beam is associated with a certain TRP RX beam.

Embodiment #5

In yet another embodiment, in case the UE does not get an acknowledgement of the switch request from the NW and the UE cannot detect a PDCCH in the new UE RX beam (corresponding to the UE RX beam from the monitored BPL) there is a large chance that the NW did not detect the BPS preamble. In this case it would be beneficial if the UE automatically goes back to the old RX beam (corresponding to the active BPL) after N (N configured by the network) number of slots in case the blocking disappeared and the NW is still using the active BPL.

Embodiment #6

In an embodiment in which the active BPL has experienced a BPLF but the failure is not catastrophic (e.g., the active BPL is degraded, but not completely blocked), if the network receives the BPS preamble from the UE, the NW transmits the next PDCCH on both the active BPL and the monitored BPL along with a "BPL activation" command informing the UE of a BPL switch. The two PDCCHs could be transmitted in OFDM symbols with some time duration between (potentially within the same slot) such that the UE has time to switch UE RX beam and try to listen to both PDCCHs plus the "BPL activation" command. This increases the chances of getting the BPL switch command through to the UE. Once the switch command is received, the UE begins to use the monitored BPL.

Figure 3:
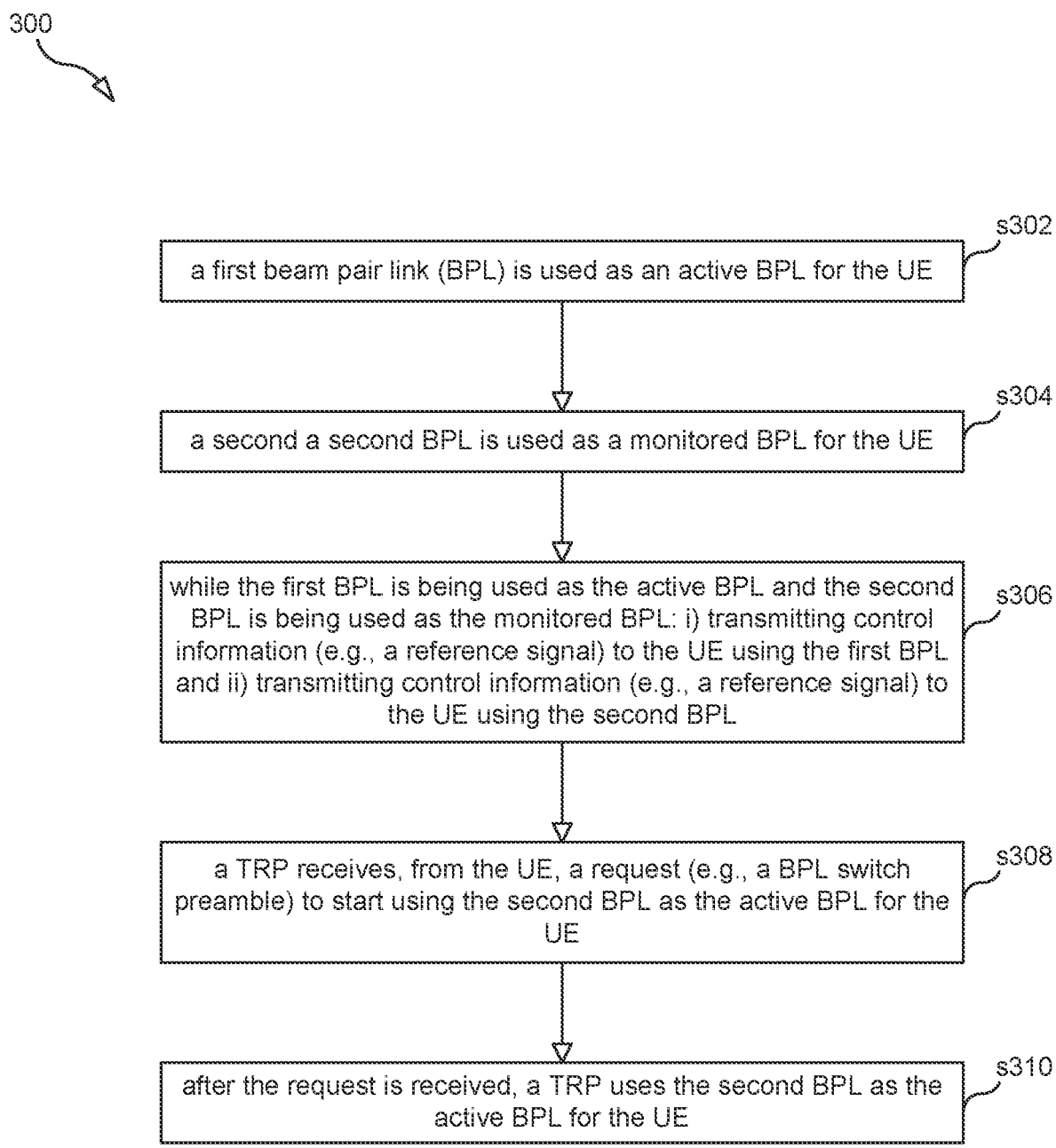
FIG. 3 is a flow chart illustrating a process according to one embodiment.

FIG. 3 is a flow chart illustrating a process 300, according to some embodiments, that is performed by one or more transmission points (TRPs) for communicating with a user equipment (UE) and for recovering from a beam pair link failure (BPLF).

Process 300 may being in step s302 in which a first beam pair link (BPL) is used as an active BPL for the UE, wherein using the first BPL comprises using a first TX beam. In step s304, a second a second BPL is used as a monitored BPL for the UE, wherein using the second BPL comprises using a second TX beam. In step s306, while the first BPL is being used as the active BPL and the second BPL is being used as the monitored BPL: i) transmitting control information (e.g., a reference signal) to the UE using the first BPL (e.g., using a first precoding vector) and ii) transmitting control information (e.g., a reference signal) to the UE using the second BPL (e.g., using a second precoding vector). In step s308, a TRP receives, from the UE, a request (e.g., a BPL switch preamble) to start using the second BPL as the active BPL for the UE. In step s310, after the request is received, a TRP uses the second BPL as the active BPL for the UE.

In some embodiments, process 300 further includes one of the TRPs, as a result of receiving the request from the UE, transmitting a BPL activation command informing the UE that a TRP is or will be using the second BPL as the active BPL for the UE.

In some embodiments, process 300 further includes a TRP, as a result of receiving the request from the UE, transmitting a first beam pair activation command informing the UE that the TRP is or will be using the second BPL as the active BPL for the UE and a TRP transmitting a second beam pair activation command informing the UE that the TRP is or will be using the second BPL as the active BPL for the UE, wherein the first BPL is used to transmit the first beam pair activation command to the UE, and the second BPL is used to transmit the second beam pair activation command to the UE.

In some embodiments, using the second BPL as the active BPL for the UE comprises a TRP transmitting a scheduling command on a PDCCH to the UE using the second BPL.

In some embodiments in which the request is a BPL switch preamble, receiving the BPL switch preamble from the UE comprises receiving a transmission from the UE on a random access channel, wherein the transmission includes the BPL switch preamble, the BPL switch preamble is distinguishable from the preambles that the UE is configured to transmit when the UE is doing a RACH attempt, e.g., during a connection setup, a connection re-establishment, or a handover, and the TRP uses the second BPL as the active BPL for the UE as a consequence of receiving the BPL switch preamble.

In some embodiments, the UE is configured to transmit the request using a UE TX beam and the step of receiving the request from the UE comprises a TRP using an RX beam corresponding to the UE TX beam to receive the request.

Figure 4:
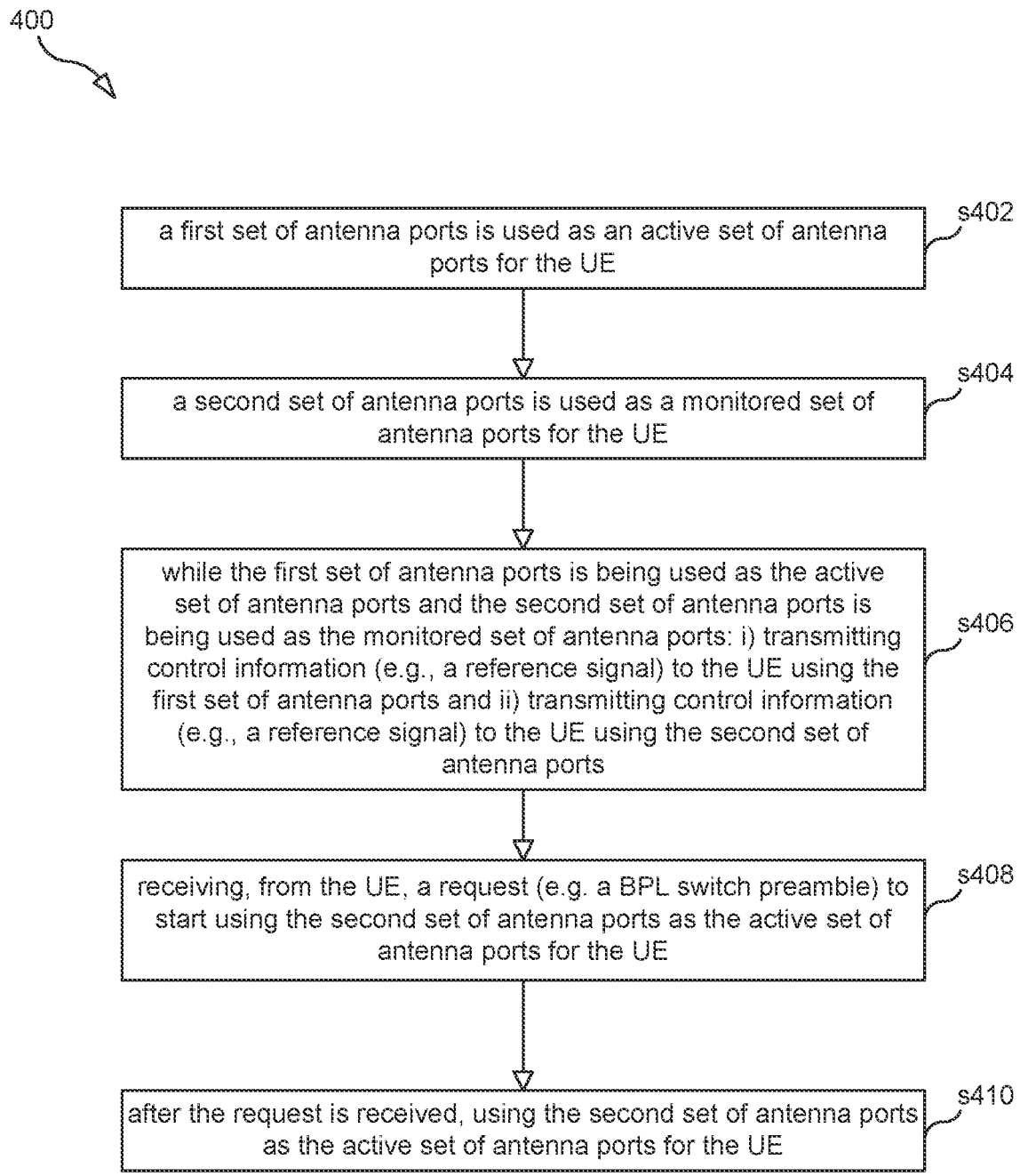
FIG. 4 is a flow chart illustrating a process according to one embodiment.

FIG. 4 is a flow chart illustrating a process 400, according to some embodiments, that is performed by one or more transmission points (TRPs) for communicating with a user equipment (UE) and for recovering from a beam pair link failure (BPLF).

Process 400 may being in step s402 in which a first set of antenna ports is used as an active set of antenna ports for the UE. In step s404, a second set of antenna ports is used as a monitored set of antenna ports for the UE. In step s406, while the first set of antenna ports is being used as the active set of antenna ports and the second set of antenna ports is being used as the monitored set of antenna ports: i) transmitting control information (e.g., a reference signal) to the UE using the first set of antenna ports and ii) transmitting control information (e.g., a reference signal) to the UE using the second set of antenna ports. In step s408, receiving, from the UE, a request (e.g. a BPL switch preamble) to start using the second set of antenna ports as the active set of antenna ports for the UE. In step s410, after the request is received, using the second set of antenna ports as the active set of antenna ports for the UE. After the request is received, at least one of the first set of antenna ports and a third set of antenna ports is used as a monitored set of antenna ports for the UE. In some embodiments, each set of antenna ports are transmitting using different beams. In some embodiments, a set of antenna ports is one or multiple CSI-RS antenna ports.

In some embodiments in which the request is a BPL switch preamble, receiving the BPL switch preamble from the UE comprises receiving a transmission from the UE on a random access channel, wherein the transmission includes the BPL switch preamble, the BPL switch preamble is distinguishable from the preambles that the UE is configured to transmit when the UE is doing a RACH attempt, e.g., during a connection setup, a connection re-establishment, or a handover, and the TRP, as a consequence of receiving the BPL switch preamble, uses the second set of antenna ports as the active set of antenna ports for the UE.

In some embodiments, process 300 and 400 further includes providing to the UE BPLF parameters (e.g., Bout, Nout, and Tout), wherein the parameters are configured such that the UE has a high probability of detecting a BPLF before detecting an RLF (based on, for example, Qin, Qout, N310, T310 etc.) (e.g., the BPLF parameters provided to the UE can be configured such that Bout is not too low, or Nout is not too large in comparison to the RLF parameters).

Figure 5:
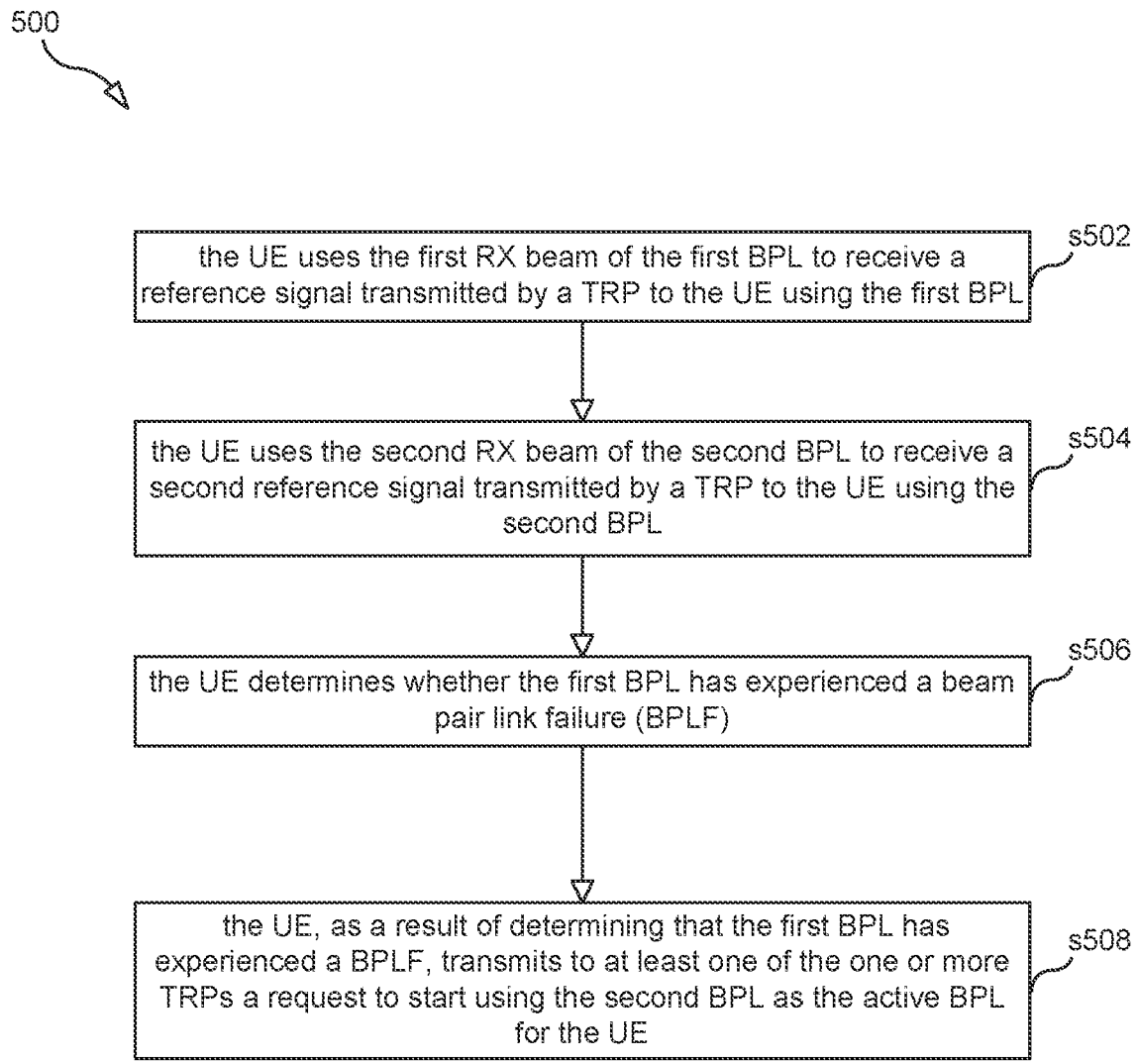
FIG. 5 is a flow chart illustrating a process according to one embodiment.

FIG. 5 is a flow chart illustrating a process 500, according to some embodiments, that is performed by a user equipment (UE) communicating with one or more transmission points (TRPs), wherein the TRPs are configured to transmit information to the UE using a first beam pair link (BPL), wherein the TRPs use the first BPL as an active BPL for the UE and use a second BPL as a monitored BPL for the UE, wherein the first BPL comprises a first TX beam and a first RX beam corresponding to the first TX beam and the second BPL comprises a second TX beam and a second RX beam corresponding to the second TX beam.

Process 500 may being in step s502 in which the UE uses the first RX beam of the first BPL to receive a reference signal transmitted by a TRP to the UE using the first BPL. Using the first RX beam to receive a signal, in some embodiments, means that the UE uses certain parameters to receive the signal. For example, in some embodiments the UE uses phase and/or amplitude adjustment parameters for each signal received via multiple receive antennas, which parameters are applied to the signals before combining or summation of the signals. In step s504, the UE uses the second RX beam of the second BPL to receive a second reference signal transmitted by a TRP to the UE using the second BPL. In step s506, the UE determines whether the first BPL has experienced a beam pair link failure (BPLF). In step s508, the UE, as a result of determining that the first BPL has experienced a BPLF, transmits to at least one of the one or more TRPs a request to start using the second BPL as the active BPL for the UE. In some embodiments, process 500 also includes the UE, after transmitting the request, receiving from a TRP a beam pair activation command informing the UE that a TRP is or will be using the second BPL as the active BPL for the UE.

In some embodiments, receiving the beam pair activation command comprises one of: the UE using the first RX beam to receive the beam pair activation command, and the UE using the second RX beam to receive the beam pair activation command.

In some embodiments, process 500 further includes, after the UE transmits the request, the UE uses the second RX beam to search for a scheduling command transmitted to the UE.

In some embodiments, the request is a BPL switch preamble, the BPL switch preamble is distinguishable from the preambles that the UE is configured to transmit when the UE is doing a RACH attempt, e.g., during a connection setup, a connection re-establishment, or a handover, and transmitting the BPL switch preamble comprises transmitting the preamble using a random access channel.

In some embodiments, determining whether the first BPL has experienced a BPLF comprises: the UE calculating a reference signal quality value, and the UE determining whether the calculated reference signal quality value falls below a threshold (Bout). In some embodiments, the threshold is dependent on the quality of the second BPL. In some embodiments, calculating the reference signal quality value comprises calculating one or more of RSRP and RSRQ based on a first reference signal received by the UE using the first RX beam.

In some embodiments, determining whether the first BPL has experienced a BPLF comprises: the UE calculating a plurality of reference signal quality values, and for each of the plurality of calculated reference signal quality values, the UE determining whether the calculated reference signal quality value (or a function thereof) is less than a threshold (Bout). In some embodiments, the UE determines whether the number of reference signal quality values that are less than the threshold meets or exceeds a second threshold (Nout).

In some embodiments, determining whether the first BPL has experienced a BPLF comprises the UE determining that the UE has not successfully received via the first BPL a PDCCH for a pre-determined time (Tout).

In some embodiments, as a result of determining that the first BPL has experienced a BPLF, the UE transmits a plurality of requests for the TRPs to start using the second BPL as the active BPL for the UE. The transmission of the plurality of requests may include: the UE using a first UE TX beam to transmit a BLP switch preamble and the UE using a second UE TX beam to transmit a BLP switch preamble, and the first and second UE TX beams are not mutually QCL with respect to spatial properties.

Figure 6:
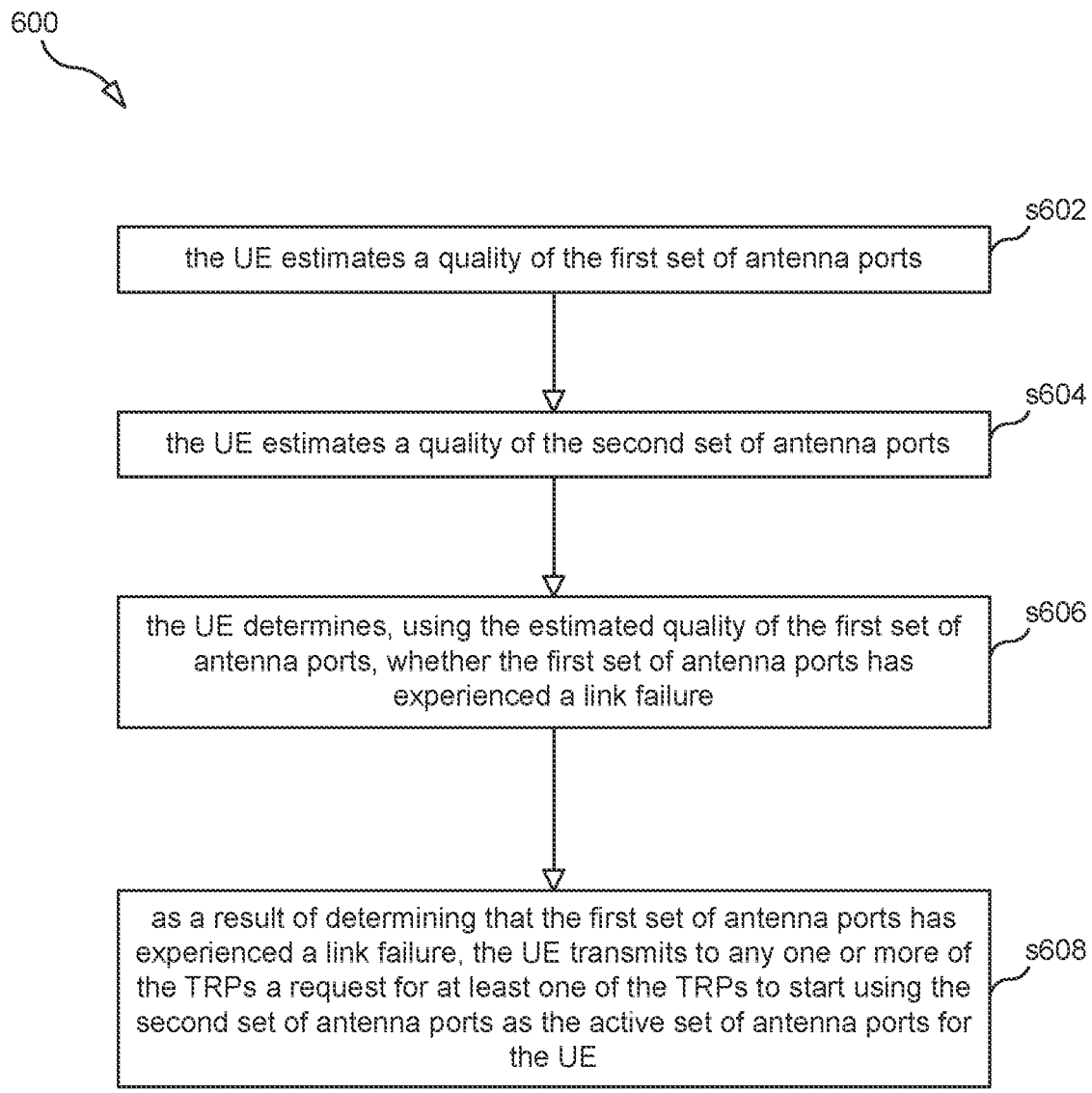
FIG. 6 is a flow chart illustrating a process according to one embodiment.

FIG. 6 is a flow chart illustrating a process 600, according to some embodiments, that is performed by a user equipment (UE) communicating with one or more transmission points (TRPs), wherein the UE is measuring two sets of antenna ports, a first set and a second set, transmitted from TRPs, wherein the TRPs use the first set of antenna ports as an active set of antenna ports for the UE and use a second set of antenna ports as a monitored set of antenna ports for the UE.

Process 600 may begin in step s602 in which the UE estimates a quality of the first set of antenna ports. In step s604, the UE estimates a quality of the second set of antenna ports. In step s606, the UE determines, using the estimated quality of the first set of antenna ports, whether the first set of antenna ports has experienced a link failure. In step s608, as a result of determining that the first set of antenna ports has experienced a link failure, the UE transmits to any one or more of the TRPs a request for at least one of the TRPs to start using the second set of antenna ports as the active set of antenna ports for the UE.

In some embodiments, the first set of antenna ports are transmitting using a first set of one or more beams, and the second set of antenna ports are transmitting using a second set of one or more beams. In some embodiments, the first set of antenna ports comprises one or more CSI-RS antenna ports.

In some embodiments, process 600 further includes the UE receiving BPLF parameters (e.g., Bout, Nout, and Tout), wherein the parameters are configured such that the UE has a high probability of detecting a BPLF before detecting an RLF (based on, for example, Qin, Qout, N310, T310 etc.) (e.g., the BPLF parameters provided to the UE can be configured such that Bout is not too low, or Nout is not too large in comparison to the RLF parameters).

In some embodiments, process 600 further includes, the UE, after transmitting the request, determining whether it has been unable to detect a PDCCH within N number of slots (N>1); and as a result of determining that it has been unable to detect a PDCCH within N number of slots, the UE reverts back to use a previous configuration for detecting PDCCHs.

In some embodiments, the request is a BPL switch preamble, the BPL switch preamble is distinguishable from the preambles that the UE is configured to transmit when the UE is doing a RACH attempt, e.g., during a connection setup, a connection re-establishment, or a handover, and transmitting the BPL switch preamble comprises transmitting the preamble using a random access channel.

Figure 7:
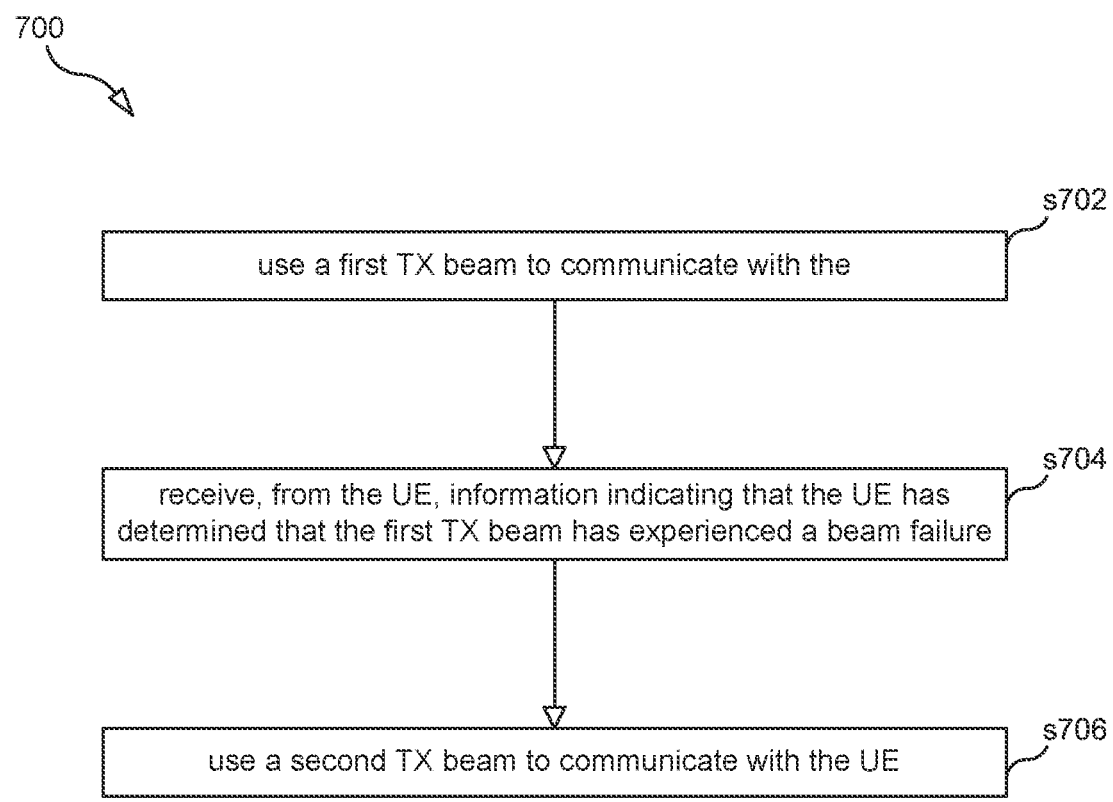
FIG. 7 is a flow chart illustrating a process according to some embodiments.

FIG. 7 is a flow chart illustrating a process 700, according to some embodiments, that is performed by a TRP (e.g., TRP 150 or TRP 950). In step s702, the TRP uses a first transmit, TX, beam to communicate with the UE 101. In step s704, the TRP receives, from the UE, information indicating that the UE has determined that the first TX beam has experienced a beam failure. In step s706, after the information is received, the TRP uses a second TX beam to communicate with the UE.

In some embodiments, the process 700 further includes, as a result of receiving the information from the UE, one of the TRPs transmitting a beam activation command informing the UE that a TRP is or will be using the second TX beam to communicate with the UE.

In some embodiments, the process 700 further includes, as a result of receiving the information from the UE, a first TRP using the first TX beam to transmit a first beam activation command informing the UE that the first TRP is or will be using the second TX beam to communicate with the UE and a second TRP using the second TX beam to transmit a second beam activation command informing the UE that the second TRP is or will be using the second TX beam to communicate with the UE.

In some embodiments, using the second TX beam to communicate with the UE comprises a TRP transmitting a scheduling command on a PDCCH to the UE using the second TX beam.

In some embodiments, the received information indicating that the UE has determined that the first TX beam has experienced a beam failure is a preamble. In some embodiments, receiving the preamble from the UE comprises a TRP receiving a transmission from the UE on a random access channel, wherein the transmission includes the preamble. In some embodiments, the preamble is distinguishable from preambles that the UE is configured to transmit when the UE is doing a RACH attempt. In some embodiments, the TRP uses the second TX beam to communicate with the UE as a consequence of receiving the preamble.

In some embodiments, the process 700 further includes, before receiving the information, i) transmitting a reference signal to the UE using the first TX beam and ii) transmitting the reference signal to the UE using the second TX beam.

In some embodiments, the received information indicating that the UE has determined that the first TX beam has experienced a beam failure is a beam switch request.

Figure 8:
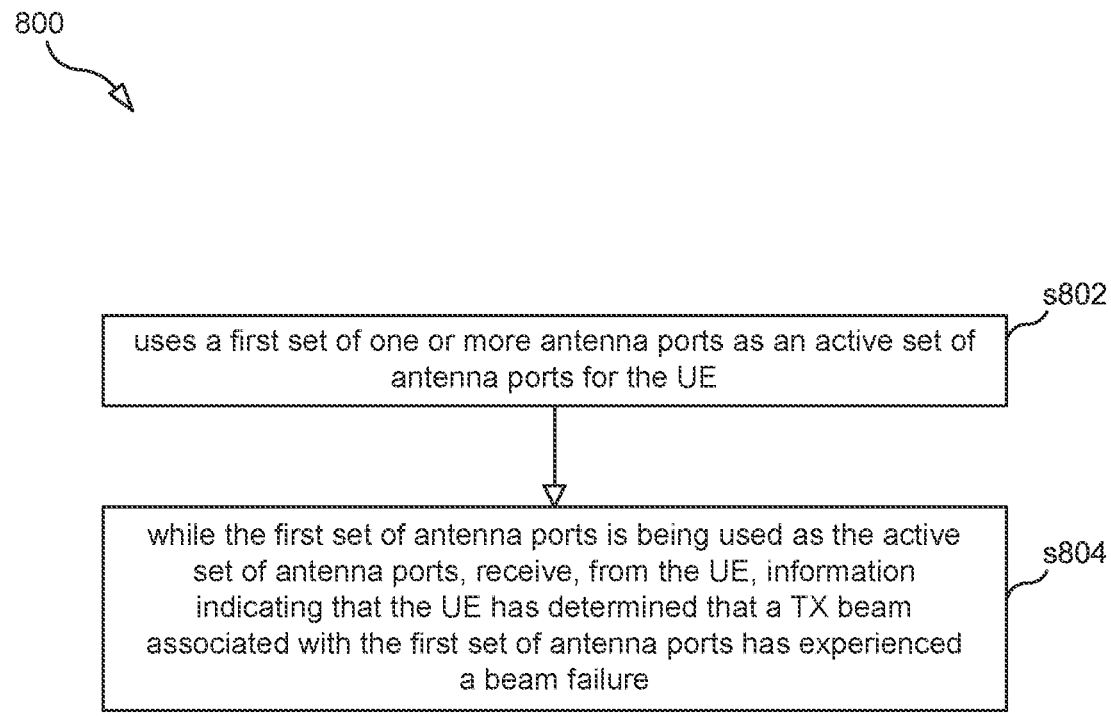
FIG. 8 is a flow chart illustrating a process according to some embodiments.

FIG. 8 is a flow chart illustrating a process 800, according to some embodiments, that is performed by a TRP (e.g., TRP 150 or TRP 950). In step s802, the TRP uses a first set of one or more antenna ports as an active set of antenna ports for the UE 101. In step s804, the TRP, while the first set of antenna ports is being used as the active set of antenna ports, receives, from the UE, information indicating that the UE has determined that a TX beam associated with the first set of antenna ports has experienced a beam failure.

In some embodiments, the first set of antenna ports is one or multiple CSI-RS antenna ports.

In some embodiments, the process further includes providing to the UE certain parameters, wherein the certain parameters are configured such that the UE has a high probability of detecting a beam link failure before detecting a radio link failure (RLF).

In some embodiments, the received information is a preamble. In some embodiments, receiving the preamble from the UE comprises a TRP receiving a transmission from the UE on a random access channel, wherein the transmission includes the preamble. In some embodiments, the preamble is distinguishable from the preambles that the UE is configured to transmit when the UE is doing a RACH attempt, and the TRP uses a second TX beam to communicate with the UE as a consequence of receiving the preamble, wherein the second TX beam is associated with a second set of antenna ports.

Figure 9:
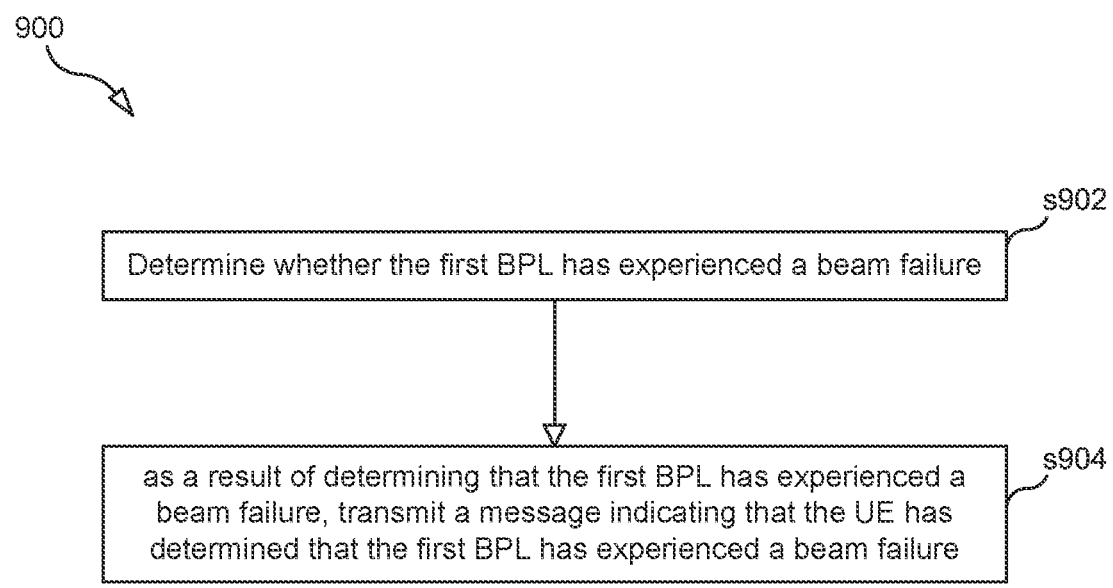
FIG. 9 is a flow chart illustrating a process according to some embodiments.

FIG. 9 is a flow chart illustrating a process 900, according to some embodiments, performed by UE 101, which is communicating with a TRP, wherein the TRP is configured to transmit information to the UE using a first beam pair link, BPL, wherein the TRP uses the first BPL as an active BPL for the UE. In step s902, the UE 101 determines whether the first BPL has experienced a beam failure. In step s904, the UE, as a result of determining that the first BPL has experienced a beam failure, transmits a message indicating that the UE has determined that the first BPL has experienced a beam failure.

In some embodiments, the message is a beam switch request.

In some embodiments, the first BPL comprises a first receive, RX, beam and a first transmit, TX, beam. In some embodiments, the process further comprises the UE using the first RX beam of the first BPL to receive a reference signal transmitted by one or more of the TRPs using the first TX beam.

In some embodiments, the process further comprises the UE using a second RX beam of a second BPL to receive a reference signal transmitted by one or more of the TRPs using a second TX beam.

In some embodiments, the process further comprises, after transmitting the message, receiving from a TRP a message informing the UE that a TRP is or will be using a second BPL as the active BPL for the UE.

In some embodiments, the process further comprises, after the UE transmits the message, the UE uses a second RX beam to search for a scheduling command transmitted to the UE.

In some embodiments, the request is a preamble. In some embodiments, the preamble is distinguishable from the preambles that the UE is configured to transmit when the UE is doing a RACH attempt. In some embodiments, transmitting the preamble comprises transmitting the preamble using a random access channel.

In some embodiments, determining whether the first BPL has experienced a beam failure comprises: the UE calculating a reference signal quality value, and the UE determining whether the calculated reference signal quality value falls below a threshold.

In some embodiments, determining whether the first BPL has experienced a beam failure comprises: the UE calculating a plurality of reference signal quality values based on measurements of reference signals, and for each of the plurality of calculated reference signal quality values, the UE determining whether the calculated reference signal quality value or a function thereof is less than a threshold.

In some embodiments, the process also includes determining whether the number of reference signal quality values that are less than the threshold meets or exceeds a second threshold.

In some embodiments, as a result of determining that the first BPL has experienced a beam failure, the UE transmits a plurality of said messages.

Figure 10:
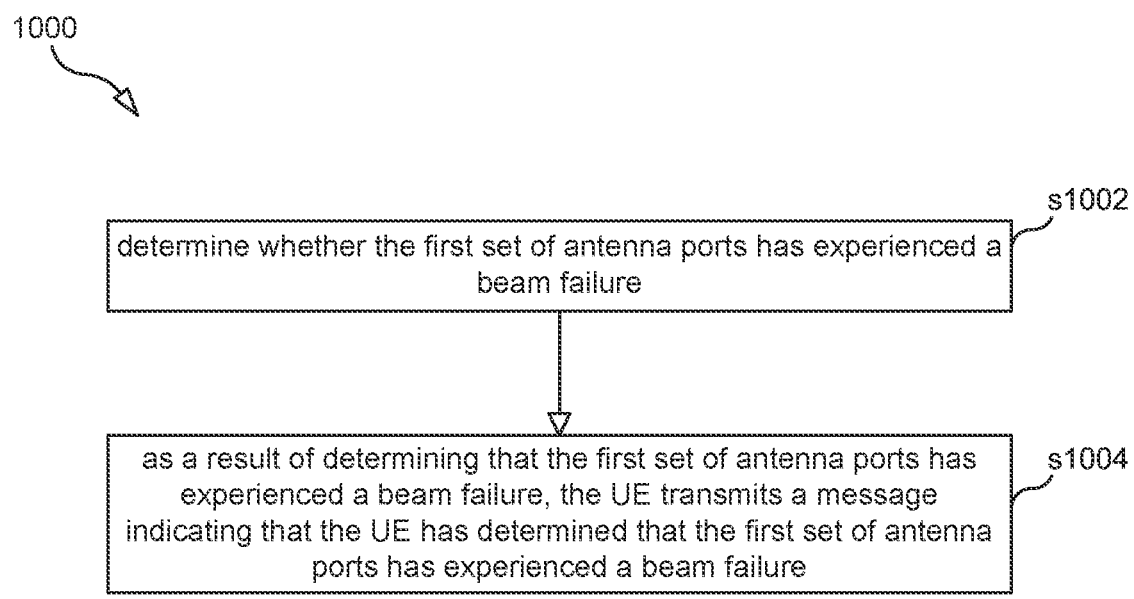
FIG. 10 is a flow chart illustrating a process according to some embodiments.

FIG. 10 is a flow chart illustrating a process 1000, according to some embodiments, performed by the UE 101, wherein the UE is measuring two sets of antenna ports, a first set and a second set, transmitted from one or more TRPs, wherein the first set of antenna ports is used as an active set of antenna ports for the UE. In step s1002, the UE determines whether the first set of antenna ports has experienced a beam failure. In step s1004, as a result of determining that the first set of antenna ports has experienced a beam failure, the UE transmits a message indicating that the UE has determined that the first set of antenna ports has experienced a beam failure.

In some embodiments, wherein the message is a beam switch request.

In some embodiments, the first set of antenna ports comprises one or more CSI-RS antenna ports.

In some embodiments, the process also includes the UE receiving beam failure parameters, wherein the parameters are configured such that the UE has a high probability of detecting a beam failure before detecting a radio link failure, RLF.

In some embodiments, the message is a preamble. In some embodiments, the preamble is distinguishable from the preambles that the UE is configured to transmit when the UE is doing a RACH attempt.

In some embodiments, transmitting the preamble comprises transmitting the preamble using a random access channel.

Figure 11:
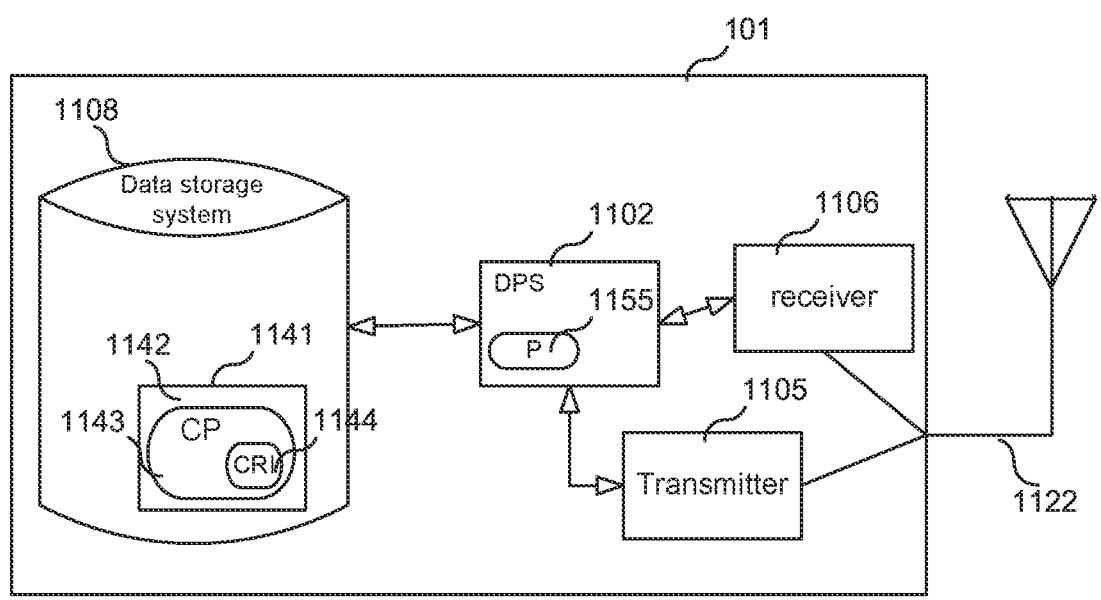
FIG. 11 is a block diagram of a UE according to some embodiments.

FIG. 11 is a block diagram of a UE 101 according to some embodiments. As shown in FIG. 11, the UE may comprise: a data processing system (DPS) 1102, which may include one or more processors 1155 (e.g., a general purpose microprocessor and/or one or more other processors, such as an application specific integrated circuit (ASIC), field-programmable gate arrays (FPGAs), and the like); a radio transmitter 1105 and a radio receiver 1106 coupled to an antenna 1122 for use in wirelessly communicating with a radio access network (RAN) node (e.g., a TRP); and local storage unit (a.k.a., "data storage system") 1112, which may include one or more non-volatile storage devices and/or one or more volatile storage devices (e.g., random access memory (RAM)). In embodiments where the UE includes a general purpose microprocessor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, but not limited, to magnetic media (e.g., a hard disk), optical media (e.g., a DVD), memory devices (e.g., random access memory, flash memory), and the like. In some embodiments, the CRI 1144 of computer program 1143 is configured such that when executed by data processing system 1102, the CRI causes the UE to perform steps described above (e.g., steps described above with reference to the flow charts). In other embodiments, the UE may be configured to perform steps described herein without the need for code. That is, for example, data processing system 1102 may consist merely of one or more ASICs. Hence, the features of the embodiments described herein may be implemented in hardware and/or software.

Figure 12:
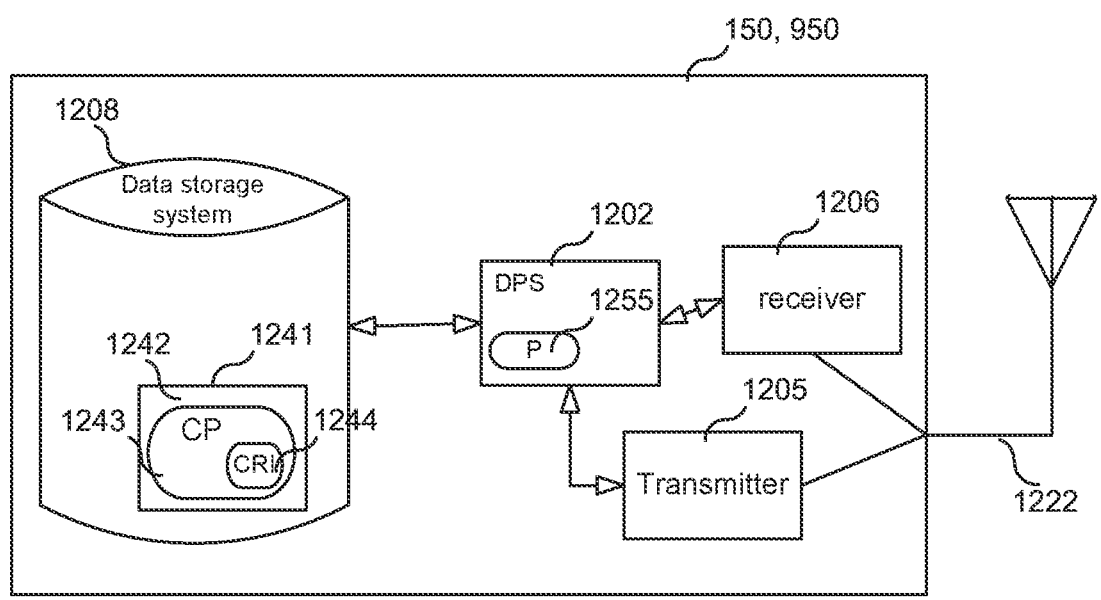
FIG. 12 is a block diagram of TRP according to some embodiments.

FIG. 12 is a block diagram of a TRP (e.g., TRP 150 or TRP 950) according to some embodiments. As shown in FIG. 12, the TRP may comprise: a data processing system (DPS) 1202, which may include one or more processors 1255 (e.g., a general purpose microprocessor and/or one or more other processors, such as an application specific integrated circuit (ASIC), field-programmable gate arrays (FPGAs), and the like); a radio transmitter 1205 and a radio receiver 1206 coupled to an antenna 1222 for use in wirelessly communicating with a UE; and local storage unit (a.k.a., "data storage system") 1212, which may include one or more non-volatile storage devices and/or one or more volatile storage devices (e.g., random access memory (RAM)). In embodiments where the TRP includes a general purpose microprocessor, a computer program product (CPP) 1241 may be provided. CPP 1241 includes a computer readable medium (CRM) 1242 storing a computer program (CP) 1243 comprising computer readable instructions (CRI) 1244. CRM 1242 may be a non-transitory computer readable medium, such as, but not limited, to magnetic media (e.g., a hard disk), optical media (e.g., a DVD), memory devices (e.g., random access memory, flash memory), and the like. In some embodiments, the CRI 1244 of computer program 1243 is configured such that when executed by data processing system 1202, the CRI causes the TRP to perform steps described above (e.g., steps described above with reference to the flow charts). In other embodiments, the TRP may be configured to perform steps described herein without the need for code. That is, for example, data processing system 1202 may consist merely of one or more ASICs. Hence, the features of the embodiments described herein may be implemented in hardware and/or software.

Additional Embodiments

TRP Embodiments

1. A method performed by one or more transmission points (TRPs) for communicating with a user equipment (UE) and for recovering from a beam pair link failure (BPLF), the method comprising: using a first beam pair link (BPL) as an active BPL for the UE, wherein using the first BPL comprises using a first TX beam; using a second BPL as a monitored BPL for the UE, wherein using the second BPL comprises using a second TX beam; while the first BPL is being used as the active BPL and the second BPL is being used as the monitored BPL: i) transmitting control information (e.g., a reference signal) to the UE using the first BPL and ii) transmitting control information (e.g., a reference signal) to the UE using the second BPL; receiving, from the UE, a request to start using the second BPL as the active BPL for the UE; and after the request is received, using the second BPL as the active BPL for the UE.

2. The method of embodiment 1, further comprising: as a result of receiving the request from the UE, one of the TRPs transmitting a BPL activation command informing the UE that a TRP is or will be using the second BPL as the active BPL for the UE.

3. The method of embodiment 1, further comprising: as a result of receiving the request from the UE, a TRP transmitting a first beam pair activation command informing the UE that the TRP is or will be using the second BPL as the active BPL for the UE and a TRP transmitting a second beam pair activation command informing the UE that the TRP is or will be using the second BPL as the active BPL for the UE, wherein the first BPL is used to transmit the first beam pair activation command to the UE, and the second BPL is used to transmit the second beam pair activation command to the UE.

4. The method of any one of embodiments 1-3, wherein using the second BPL as the active BPL for the UE comprises a TRP transmitting a scheduling command on a PDCCH to the UE using the second BPL.

5. The method of any one of embodiments 1-4, wherein the request is a BPL switch preamble.

6. The method of embodiment 5, wherein receiving the BPL switch preamble from the UE comprises receiving a transmission from the UE on a random access channel, wherein the transmission includes the BPL switch preamble, the BPL switch preamble is distinguishable from the preambles that the UE is configured to transmit when the UE is doing a RACH attempt, e.g., during a connection setup, a connection re-establishment, or a handover, and the TRP uses the second BPL as the active BPL for the UE as a consequence of receiving the BPL switch preamble.

7. The method of any one of embodiments 1-6, wherein the UE is configured to transmit the request using a UE TX beam and the step of receiving the request from the UE comprises a TRP using an RX beam corresponding to the UE TX beam to receive the request.

8. A method performed by one or more transmission points (TRPs) for communicating with a user equipment (UE) and for recovering from a beam pair link failure (BPLF), the method comprising: using a first set of antenna ports as an active set of antenna ports for the UE; using a second set of antenna ports as a monitored set of antenna ports for the UE; while the first set of antenna ports is being used as the active set of antenna ports and the second set of antenna ports is being used as the monitored set of antenna ports: i) transmitting control information (e.g., a reference signal) to the UE using the first set of antenna ports and ii) transmitting control information (e.g., a reference signal) to the UE using the second set of antenna ports; receiving, from the UE, a request to start using the second set of antenna ports as the active set of antenna ports for the UE; and after the request is received, using the second set of antenna ports as the active set of antenna ports for the UE.

9. The method of embodiment 8, further comprising, after the request is received, using at least one of the first set of antenna ports and a third set of antenna ports as a monitored set of antenna ports for the UE 10. The method of any one of embodiments 8-9, wherein each set of antenna ports are transmitting using different beams.

11. The method of any one of embodiments 8-9, wherein a set of antenna ports is one or multiple CSI-RS antenna ports.

12. The method of any one of embodiments, 1-11, further comprising providing to the UE BPLF parameters (e.g., Bout, Nout, and Tout), wherein the parameters are configured such that the UE has a high probability of detecting a BPLF before detecting an RLF (based on, for example, Qin, Qout, N310, T310 etc.) (e.g., the BPLF parameters provided to the UE can be configured such that Bout is not too low, or Nout is not too large in comparison to the RLF parameters).

13. The method of any one of embodiments 8-12, wherein the request is a BPL switch preamble.

14. The method of embodiment 13, wherein receiving the BPL switch preamble from the UE comprises receiving a transmission from the UE on a random access channel, wherein the transmission includes the BPL switch preamble, the BPL switch preamble is distinguishable from the preambles that the UE is configured to transmit when the UE is doing a RACH attempt, e.g., during a connection setup, a connection re-establishment, or a handover, and the TRP uses the second set of antenna ports as the active set of antenna ports for the UE as a consequence of receiving the BPL switch preamble.

15. A TRP comprising a transmitter, a receiver, a memory, and a data processing system comprising one or more processors, wherein the TRP is configured to perform the method of any one of embodiments 1-14. UE Embodiments 16. A method performed by a user equipment (UE) communicating with one or more transmission points (TRPs), wherein the TRPs are configured to transmit information to the UE using a first beam pair link (BPL), wherein the TRPs use the first BPL as an active BPL for the UE and use a second BPL as a monitored BPL for the UE, wherein the first BPL comprises a first TX beam and a first RX beam corresponding to the first TX beam and the second BPL comprises a second TX beam and a second RX beam corresponding to the second TX beam, the method comprising: the UE using the first RX beam of the first BPL to receive a reference signal transmitted by a TRP to the UE using the first BPL; the UE using the second RX beam of the second BPL to receive a second reference signal transmitted by a TRP to the UE using the second BPL; the UE determining whether the first BPL has experienced a beam pair link failure (BPLF); and as a result of determining that the first BPL has experienced a BPLF, the UE transmitting to at least one of the one or more TRPs a request to start using the second BPL as the active BPL for the UE.

17. The method of embodiment 16, further comprising: after transmitting the request, receiving from a TRP a beam pair activation command informing the UE that a TRP is or will be using the second BPL as the active BPL for the UE.

18. The method of embodiment 17, wherein receiving the beam pair activation command comprises one of: the UE using the first RX beam to receive the beam pair activation command, and the UE using the second RX beam to receive the beam pair activation command.

19. The method of any one of embodiments 16-18, further comprising: after the UE transmits the request, the UE using the second RX beam to search for a scheduling command transmitted to the UE.

20. The method of any one of embodiments 16-19, wherein the request is a BPL switch preamble, the BPL switch preamble is distinguishable from the preambles that the UE is configured to transmit when the UE is doing a RACH attempt, e.g., during a connection setup, a connection re-establishment, or a handover, and transmitting the BPL switch preamble comprises transmitting the preamble using a random access channel.

21. The method of any one of embodiments 16-20, wherein determining whether the first BPL has experienced a BPLF comprises: the UE calculating a reference signal quality value, and the UE determining whether the calculated reference signal quality value falls below a threshold (Bout).

22. The method of embodiment 21, wherein the threshold is dependent on the quality of the second BPL.

23. The method of any one of embodiments 18-22, wherein calculating the reference signal quality value comprises calculating one or more of RSRP and RSRQ based on a first reference signal received by the UE using the first RX beam.

24. The method of any one of embodiment 18-23, wherein determining whether the first BPL has experienced a BPLF comprises: the UE calculating a plurality of reference signal quality values, and for each of the plurality of calculated reference signal quality values, the UE determining whether the calculated reference signal quality value (or a function thereof) is less than a threshold (Bout).

25. The method of embodiment 24, further comprising determining whether the number of reference signal quality values that are less than the threshold meets or exceeds a second threshold (Nout).

26. The method of any one of embodiments 16-20, wherein determining whether the first BPL has experienced a BPLF comprises the UE determining that the UE has not successfully received via the first BPL a PDCCH for a pre-determined time (Tout).

27. The method of any one of embodiments 16-20, wherein, as a result of determining that the first BPL has experienced a BPLF, the UE transmits a plurality of requests for the TRPs to start using the second BPL as the active BPL for the UE, transmitting the plurality of requests comprises: the UE using a first UE TX beam to transmit a BLP switch preamble and the UE using a second UE TX beam to transmit a BLP switch preamble, and the first and second UE TX beams are not mutually QCL with respect to spatial properties.

28. A method performed by a user equipment (UE) communicating with one or more transmission points (TRPs), wherein the UE is measuring two sets of antenna ports, a first set and a second set, transmitted from TRPs, wherein the TRPs use the first set of antenna ports as an active set of antenna ports for the UE and use a second set of antenna ports as a monitored set of antenna ports for the UE, the method comprising: the UE estimates a quality of the first set of antenna ports; the UE estimates a quality of the second set of antenna ports; the UE determining, by using the estimated quality of the first set of antenna ports, whether the first set of antenna ports has experienced a link failure; and as a result of determining that the first set of antenna ports has experienced a link failure, the UE transmitting to any one or more of the TRPs a request for at least one of the TRPs to start using the second set of antenna ports as the active set of antenna ports for the UE.

29. The method of embodiment 28, wherein the first set of antenna ports are transmitting using a first set of one or more beams, and the second set of antenna ports are transmitting using a second set of one or more beams.

30. The method of any one of embodiments 28-29, wherein the first set of antenna ports comprises one or more CSI-RS antenna ports.

31. The method of any one of embodiments 16-30, further comprising receiving BPLF parameters (e.g., Bout, Nout, and Tout), wherein the parameters are configured such that the UE has a high probability of detecting a BPLF before detecting an RLF (based on, for example, Qin, Qout, N310, T310 etc.) (e.g., the BPLF parameters provided to the UE can be configured such that Bout is not too low, or Nout is not too large in comparison to the RLF parameters).

32. The method of any one of embodiments 16-31, further comprising: after transmitting the request, the determines whether it has been unable to detect a PDCCH within N number of slots (N>1); and as a result of determining that it has been unable to detect a PDCCH within N number of slots, the UE reverts back to use a previous configuration for detecting PDCCHs.

33. The method of any one of embodiments 28-32, wherein the request is a BPL switch preamble, the BPL switch preamble is distinguishable from the preambles that the UE is configured to transmit when the UE is doing a RACH attempt, e.g., during a connection setup, a connection re-establishment, or a handover, and transmitting the BPL switch preamble comprises transmitting the preamble using a random access channel.

34. A UE comprising a transmitter, a receiver, a memory, and a data processing system comprising one or more processors, wherein the UE is configured to perform the method of any one of embodiments 16-33.

Additional Disclosure:

The text that follows is based on the material from the appendix filed with U.S. Provisional Application No. 62/417,607, filed on Nov. 4, 2016, to which this application claims priority:

Title: On robust beam management
Agenda Item: 7.1.3.3
Document for: Discussion and Decision 1. Introduction In RAN1 #86bis, the following agreements were made:
Agreements:
1) NR supports mechanism(s) in the case of link failure and/or blockage for NR (whether to use new procedure is FFS)
2) Study at least the following aspects: a) Whether or not an DL or UL signal transmission for this mechanism is needed (e.g., RACH preamble sequence, DL/UL reference signal, control channel, etc.); and b) if needed, resource allocation for this mechanisms (e.g., RACH resource corresponding mechanism, etc.)

In this disclosure, the need of multiple beam pair links and how to handle beam pair link failures is discussed.

2. Discussion

Narrow beam transmission and reception schemes will be needed at higher frequencies to compensate the high propagation loss. For a given communication link, a beam can be applied at both the TRP and the UE, which will be referred to as a beam pair link (BPL) in this contribution. The task of the beam management procedure is to discover and maintain beam pair links.

Figure 13:
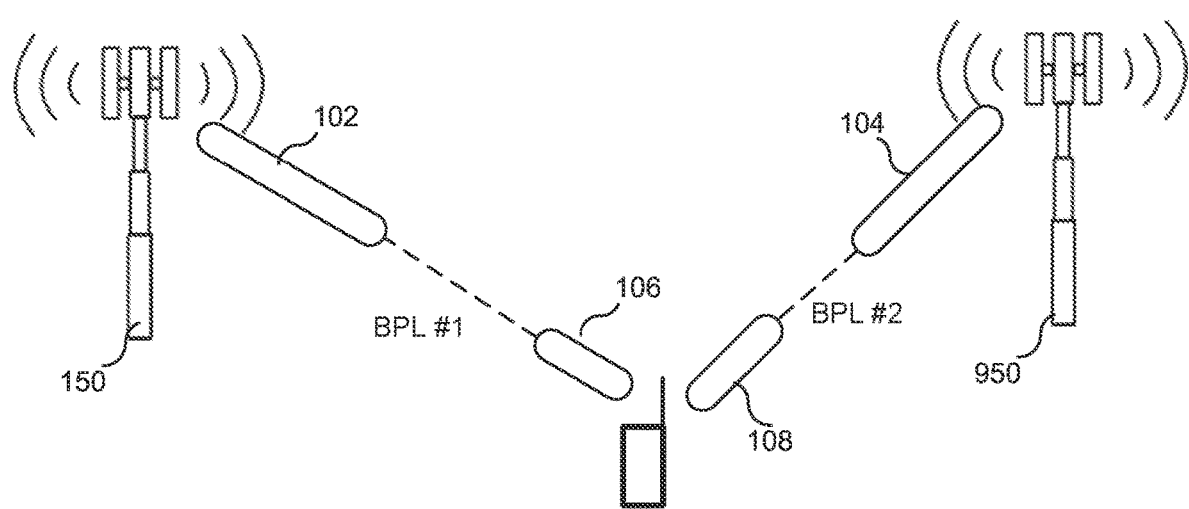
FIG. 13 illustrates two TRPs communicating with a UE using different TX beams.

In the example of FIG. 13, two BPLs have been discovered and are being maintained by the network. Note that even in the case of a single TRP, multiple BPLs are still possible, considering reflections etc. A BPL is discovered and monitored by the network using measurements, either uplink measurements using uplink sounding or downlink measurements using the reference signals used for beam management, i.e., CSI-RS.

Due to the high penetration loss through objects and poor diffraction around object edges at high frequencies a BPL will be sensitive to blocking. Blocking can occur either slowly/gradually or very suddenly depending on the UE speed and the motion of objects in the environment. The narrower the beams, the more chance there is for sudden blocking to occur. To establish more robust communication in a multi-beam system, multiple BPLs can be used between a TRP (or multiple TRPs) and a UE. There can be one or more active BPL(s) used for ongoing transmission and reception of data and control signals, and one or more monitored BPL(s) used for backup purposes.

It is therefore believed that it may be useful to monitor multiple BPLs in parallel for a given UE:
  Robustness is achieved since a BPL may suddenly be blocked and control and data transmission can quickly be carried over to the alternative BPL
  Distributed MIMO transmissions can be supported by using SU-MIMO transmissions to the UE from multiple TRPs at the same time
  In LOS conditions, the rank per BPL is limited to two (dual polarizations) while distributed MIMO allows for higher rank transmissions.

In the case one or multiple BPL are used simultaneously for a UE, and in case of multiple BPLs it is useful to introduce some priority, e.g. for PDCCH search space monitoring purpose. Hence, the notion of active and monitored BPL where the UE monitors the PDCCH assuming at least the active BPL while the monitored BPLs are maintained to serve as a backup or to discover new BPLs. Hence, measurements are scheduled for each BPL separately for beam refinement or beam discovery, where discovery is more targeted the monitored link is introduced.

The TRP can switch active BPL to a monitored BPL by signaling a BPL switch command to the UE. In case the TRP notice a slow blocking of a BPL the TRP can signal a BPL switch command, through the active BPL, to the UE such that the monitored BPL becomes the new active BPL. However, in case the blocking is too sudden the TRP will not have time to signal a BLP switch command to the UE and the link used for control and data signals between TRP and UE will be lost. When such blocking occurs, the event can be referred to as a "beam pair link failure" or BPLF or "beam failure". There is a need for NR to handle BPLF in a quick and efficient way to maintain high and reliable performance for the users.

Observation 1: Using multiple beam-pair links can improve the robustness in beam-based systems
Proposal 1: An active beam pair link is supported for which the UE is monitoring PDCCH
Proposal 2: One or more monitored beam-pair links is supported to improve the robustness and to discover new links
Observation 2: There is a need to handle BPL failure in a quick and efficient way to maintain high and reliable performance for the users.

One way to mitigate BPLF is for the UE to receive the DL control signaling (PDCCH) over both the active and monitored BPLs but with a larger duty cycle for the monitored BPL compared to the active BPL. For example, the control signaling can be scheduled every slot on the active link and scheduled every Nth slot on the monitored link. In this way, in case the active BPL is blocked and the UE cannot decode the control signaling, the UE can receive control signaling transmitted on the monitored link.

Proposal 3: Study PDCCH reception on monitored BPLs as a mean for increase robustness against BPL blocking.

The control signaling on the monitored link can contain a BPL switch command, to change the used BPL as being active.

The handling of active and monitored BPLs, as well as discovering new BPLs, should be controlled by the network as much as possible. However, in some cases when a BPLF has occurred it might be difficult for the network to re-establish the connection, i.e. find a new suitable BPL between the TRP and the UE. If the BPLF last too long it will cause a radio link failure (RLF), which introduce extra latency and overhead signaling.

It has been discussed that the UE could signal to the TRP that a BPLF has occurred using a specific RACH preamble and in this way help the network to find a new BPL quicker. The specific RACH preamble can be dedicated for handling BPLFs, such that the network knows that when this RACH preamble is detected a BPLF has occurred.

Proposal 4: The handling of active and monitored BPLs, as well as potential BPLFs, should be controlled by the network as much as possible 3. Conclusions In this disclosure, the following observations are noted:

Observation 1: Using multiple beam-pair links can improve the robustness in beam-based systems Observation 2: There is a need to handle BPL failure in a quick and efficient way to maintain high and reliable performance for the users.

Based on aspects discussed in this disclosure, the following are proposed, along with other disclosed embodiments:

Proposal 1: An active beam pair link is supported for which the UE is monitoring PDCCH Proposal 2: One or more monitored beam-pair links are supported to improve the robustness and to discover new links Proposal 3: Study PDCCH reception on monitored BPLs as a means to increase robustness against BPL blocking.

Proposal 4: The handling of active and monitored BPLs, as well as potential BPLFs, should be controlled by the network as much as possible While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A user equipment (UE), the UE comprising:
a transmitter;
a receiver;
a memory; and
a data processing system comprising one or more processors, wherein the UE is configured to:
based on measurements of reference signals that were transmitted using a first transmit (TX) beam, detect whether a beam failure has occurred; and
as a result of detecting that the beam failure has occurred, transmit at least a first beam failure message indicating that the UE has detected that the beam failure has occurred, wherein
the UE is configured to determine whether the beam failure has occurred by performing a process that comprises:
determining whether a determined radio link quality value satisfies a condition; and
as a result of determining that the determined radio link quality value satisfies a condition, calculating $C\_new=C\_old+x$, wherein $C\_old$ is a counter value and x is a predetermined constant;
comparing $C\_new$ to a threshold; and
based on the comparing, determining whether the beam failure has occurred.

2. The UE of claim 1, wherein the first beam failure message is a preamble.

3. The UE of claim 2, wherein
transmitting the preamble comprises transmitting the preamble using a random access channel (RACH), and
the preamble is not a handover preamble.

4. The UE of claim 3, wherein the preamble is distinguishable from preambles that the UE is configured to transmit when the UE is doing a RACH attempt.

5. The UE of claim 1, wherein the UE is configured such that, as a result of the UE detecting that the beam failure has occurred, the UE transmits not only the first beam failure message but also at least a second beam failure message that also indicates that the UE has detected that the beam failure has occurred.

6. The UE of claim 1, wherein the UE is configured to use a first receive (RX) beam to receive the reference signals.

7. The UE of claim 6, wherein the reference signals are a channel state information reference signals (CSI-RSs).

8. The UE of claim 6, wherein the UE is further configured such that, after the UE transmits the first beam failure message indicating that the UE has determined that the beam failure has occurred, the UE uses a second RX beam to search for a scheduling command transmitted to the UE.

9. The UE of claim 1, wherein x=1.

10. The UE of claim 1, wherein determining whether the determined radio link quality value satisfies a condition comprises determining whether the determined radio link quality value is less than a second threshold.

11. The UE of claim 1, wherein determining whether the determined radio link quality value satisfies a condition comprises determining whether X is less than a second threshold, wherein $X=f(v)$, v=is the determined radio link quality value, and f( ) is a predetermined function.

12. A method performed by a user equipment (UE), the method comprising:
based on measurements of reference signals that were transmitted using a first transmit (TX) beam, the UE detecting that a beam failure has occurred; and
as a result of detecting that the beam failure has occurred, the UE transmitting a beam failure message indicating that the UE has detected that the beam failure has occurred, wherein the step of determining that the beam failure has occurred comprises:
determining whether a determined radio link quality value satisfies a condition; and
as a result of determining that the determined radio link quality value satisfies a condition, calculating $C\_new=C\_old+x$, wherein $C\_old$ is a counter value and x is a predetermined constant;
comparing $C\_new$ to a threshold; and
based on the comparing, determining whether the beam failure has occurred.

13. The method of claim 12, further comprising:
after transmitting the beam failure message, receiving a message informing the UE that a serving base station has selected a new TX beam for use in communicating with the UE.

14. The method of claim 12, wherein the beam failure message is a preamble.

15. The method of claim 14, wherein
transmitting the preamble comprises transmitting the preamble using a random access channel (RACH), and
the preamble is not a handover preamble.

16. The method of claim 15, wherein the preamble is distinguishable from the preambles that the UE is configured to transmit when the UE is doing a RACH attempt.

17. The method of claim 12, further comprising, as a result of determining that the beam failure has occurred, transmitting a plurality of said beam failure messages indicating that the UE has determined that the beam failure has occurred.

18. The method of claim 12, further comprising using a first receive (RX) beam to receive a reference signal transmitted by the serving gNB using the first TX beam.

19. The method of claim 18, wherein the reference signal is a channel state information reference signal (CSI-RS).

20. The method of claim 18, further comprising, after transmitting the beam failure message indicating that the UE has determined that the beam failure has occurred, using a second RX beam to search for a scheduling command.

* * * * *